(12) United States Patent
Mann et al.

(10) Patent No.: US 12,367,630 B2
(45) Date of Patent: Jul. 22, 2025

(54) GENERATIVE FILMS

(71) Applicant: Flawless Holdings Limited, London (GB)

(72) Inventors: Scott Mann, London (GB); Hyeongwoo Kim, London (GB)

(73) Assignee: Flawless Holdings Limited, London (GB)

( * ) Notice: Subject to any disclaimer, the term of this patent is extended or adjusted under 35 U.S.C. 154(b) by 148 days.

(21) Appl. No.: 18/063,555

(22) Filed: Dec. 8, 2022

(65) Prior Publication Data

US 2024/0193835 A1 Jun. 13, 2024

(51) Int. Cl.
*G06T 13/40* (2011.01)

(52) U.S. Cl.
CPC .......... *G06T 13/40* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 5,680,481 A * | 10/1997 | Prasad | ............... | G06N 3/049 |
| | | | | 382/118 |
| 7,027,054 B1 * | 4/2006 | Cheiky | ............... | H04N 5/262 |
| | | | | 345/473 |
| 7,168,953 B1 * | 1/2007 | Poggio | ............... | G06T 13/205 |
| | | | | 704/E21.02 |
| 8,488,877 B1 * | 7/2013 | Owechko | ............... | G06V 20/64 |
| | | | | 382/165 |
| 11,398,255 B1 | 7/2022 | Mann et al. | | |
| 2003/0198402 A1 | 10/2003 | Zhang et al. | | |

(Continued)

FOREIGN PATENT DOCUMENTS

| CN | 113269872 A | 6/2021 |
|---|---|---|
| CN | 113111861 A | 7/2021 |

(Continued)

OTHER PUBLICATIONS

Garrido et al: Reconstruction of Personalized 30 Face Rigs from Monocular Video™ ACM Transactions on Graphics, Sep. 2015.

(Continued)

*Primary Examiner* — David H Chu
(74) *Attorney, Agent, or Firm* — EIP US LLP

(57) ABSTRACT

A computer implemented method includes receiving, from a remote system, object data comprising values of a set of adjustable parameters of a respective object representation model for each object of a plurality of objects and compositing data indicating at least a respective trajectory of each of the plurality of objects relative to a reference frame. The method includes processing the object data and the compositing data using the respective object representation models to generate output video data depicting a scene including an animated representation of each object of the plurality of objects following the respective trajectory relative to the reference frame. For each object of the plurality of objects, the respective object representation model comprises a respective neural network and is arranged to generate, using the respective neural network, animated representations of the object in which a geometry the object is controllable by the set of adjustable parameters.

18 Claims, 9 Drawing Sheets

(56) References Cited

U.S. PATENT DOCUMENTS

| | | | |
|---|---|---|---|
| 2007/0078636 A1* | 4/2007 | Elsberg | G06F 30/13 703/2 |
| 2010/0007665 A1* | 1/2010 | Smith | G06T 13/40 345/473 |
| 2010/0026700 A1* | 2/2010 | Michail | G09G 5/363 345/582 |
| 2010/0328055 A1* | 12/2010 | Fong | B60Q 9/008 348/148 |
| 2011/0228987 A1* | 9/2011 | Iwasaki | G06T 7/215 382/107 |
| 2012/0154684 A1 | 6/2012 | Luo et al. | |
| 2014/0253561 A1* | 9/2014 | Marvie | G06T 13/80 345/473 |
| 2016/0034306 A1* | 2/2016 | Galdy | G06F 9/4881 718/104 |
| 2017/0243387 A1* | 8/2017 | Li | G06V 20/46 |
| 2018/0374499 A1 | 12/2018 | Zadgaonkar et al. | |
| 2020/0364834 A1* | 11/2020 | Ferrés | G06T 5/60 |
| 2021/0150793 A1 | 5/2021 | Stratton et al. | |
| 2021/0248801 A1 | 8/2021 | Li et al. | |
| 2021/0272599 A1 | 9/2021 | Patterson et al. | |
| 2021/0365707 A1 | 11/2021 | Mao et al. | |
| 2022/0035961 A1 | 2/2022 | Ziabari et al. | |
| 2022/0067967 A1 | 3/2022 | Luo et al. | |
| 2022/0067982 A1 | 3/2022 | Pardeshi et al. | |
| 2022/0262036 A1* | 8/2022 | Guldbrandsen | G06T 13/40 |
| 2023/0005203 A1* | 1/2023 | Shi | G06T 13/40 |
| 2023/0121890 A1* | 4/2023 | Gong | A61B 6/5258 348/607 |
| 2023/0123820 A1* | 4/2023 | Wang | G06N 3/088 345/474 |
| 2023/0154089 A1* | 5/2023 | Bradley | G06N 3/045 345/474 |

FOREIGN PATENT DOCUMENTS

| | | |
|---|---|---|
| CN | 113256821 A | 8/2021 |
| CN | 113628326 A | 11/2021 |
| CN | 115130493 | 9/2022 |
| GB | 2601162 A | 5/2022 |
| WO | 2021155140 A1 | 8/2021 |
| WO | 2022106654 | 5/2022 |
| WO | 2022248862 | 12/2022 |

OTHER PUBLICATIONS

Tewari et al: "High-Fidelity Monocular Face Reconstruction based on an Unsupervised Model-based Face Autoencoder" IEEE Transactions on Pattern Analysis and Machine Intelligence, 2018.

Kim et al: "Neural Style-Preserving Visual Dubbing" Comnell University, Sep. 5, 2019.

Kim et al: "Deep Video Portraits" Cornell University, May 29, 2018.

Lu et al: "Deep Regression Tracking with Shrinkage Loss" ECCV 2018 paper.

Rozantsev, "On rendering synthetic images for training an object detector", 2015.

Prajwal et al: "Towards Automatic Face-to-Face Translation" Cornell University, Mar. 1, 2020 https://arxiv.org/abs/2003.00418.

"Create Crazy Morphing Animations" Animating with AI, Mar. 8, 2020 https://www.youtube.com/watch?v=67w5CTkxXdA.

Xin Wen et al: "Photorealistic Audio-driven Video Portraits" IEEE Transactions on Visualization and Computer Graphics, vol. 26, No. 12, Sep. 17, 2020, pp. 3457-3466, XP011819361.

Garrido et al: "Vdub: Modifying Face Video of Actors for Plausible Visual Alignment to a Dubbed Audio Track", Computer Graphics Forum: Journal of the European Association for Computer Graphics, vol. 34, No. 2, May 1, 2015, pp. 1-12, XP055827600.

Fried et al: "Text-based editing of talking-head videa" ACM Transactions on Graphics, vol. 38, No. 4, Jul. 12, 2019, pp. 1-14, XP058452128.

Chuang et al: "Performance Driven Facial Animation using Blendshape Interpolation" Technical report CS-TR-2002-02, Jan. 1, 2002, pp. 1-8, XP055973917.

Ezzat at al: "MikeTalk: a talking facial display based on morphing visemes" Computer Animation 98. Proceedings Philadelphia, Jun. 8, 1998, pp. 96-102, XP010285088.

Anonymous: "Michael Jackson—Black or White (1991)—Computer Animation history-CGI!" Dec. 10, 2020, pp. 1-11, XP055971741.

Bregler Christoph et al: "Video Rewrite driving visual. speech with audio", Computer Graphics Proceedings. SIGGRAPH 99; [Computer Graphics Proceedings. SIGGRAPH, ACM—New York, NY, USA, 1515 Broadway, 17th Floor New York, NY 10036 USA, Aug. 3, 1997 (Aug. 3, 1997), pp. 353-360, XP059029656, DOI: 10.1145/258734.258880 ISBN: 978-0-201-48560-8 section 1 figures 1,2.

Eloise Berson et al: "Intuitive Facial Animation Editing Based on a Generative RNN Framework", arxiv.org, Cornell University Library, 201 Olin Library Cornell University Ithaca, NY 14853, Oct. 12, 2020 (Oct. 12, 2020), XP081784180, paragraph [4.3.3]; figure 7.

* cited by examiner

GENERATIVE FILMS

BACKGROUND OF THE INVENTION

Field of the Invention

The present invention relates to the generation and editing of video data comprising animated representations of objects. The invention has particular, but not exclusive, relevance to visual dubbing of feature films.

Description of the Related Technology

The production of live action feature films (filmmaking) is a time-consuming and expensive process, and typically requires the involvement of a large number of skilled professionals performing many interdependent tasks subject to strict constraints on time and resources. A typical filmmaking process involves a production phase spread over multiple shoots, in which raw video footage is captured (along with audio) for multiple takes of each scene of the film, typically by multiple cameras and potentially in various video formats. The footage is passed to a post-production house, which carries out a post-production process including an offline edit in which the raw footage is copied and compressed before selected portions are assembled by an editor and/or director to generate an offline edit. Sections of the raw video footage corresponding to the offline edit are then obtained and visual effects (VFX) are applied where necessary whilst the audio is mixed, edited, and rerecorded if necessary. The resulting footage and audio are then subject to a finishing stage in which additional processes, such as color grading, may be applied before the master copy of the film is delivered to a distribution house, which is responsible for storing the resulting media and sharing with appropriate parties.

For some films, foreign language versions may be produced in parallel, or after, the production of the original film. In a conventional pipeline, the distribution house provides a low-resolution version of the final film video to a so-called localization house, along with a music and effects track including a version of the finished audio excluding the primary language dialogue. Secondary language actors at the localization house then record secondary language dialogue audio to be combined with the final film video and the music and effects track, and these elements are combined and provided to the distribution house as a secondary language version of the film to be distributed to end users. It is generally accepted that the foreign language version of the film may lose much of the nuance and quality of the original film, and accordingly the monetary value of a foreign language version of a film is typically much lower than that of the original film.

Recent advances in deep learning technology, such as those disclosed in U.S. Pat. No. 11,398,255, the entirety of which is incorporated herein by reference, have provided means for visual dubbing of films, meaning that mouth shapes of actors can be modified within the film whilst maintaining the overall expression and nuance of the actors' performance. This technology paves the way for secondary language versions of films which maintain a much greater degree of the quality, and accordingly value, of the original film. Furthermore, such technology may obviate the need for reshoots of scenes of an original film in which aspects of an actor's performance needs to be modified. Reshoots can be costly, inconvenient, and in some cases not possible, for example if the scene is highly dependent on weather conditions or other uncontrollable variables.

Integrating the visual dubbing technologies discussed above into the existing filmmaking pipeline is challenging, because of the serial nature of the tasks performed by the post-production house and the localization house (which are typically separate commercial entities). In particular, it is undesirable for a secondary language film to be returned to the post-production house after visual dubbing has been performed, particularly if secondary language versions are created for many different languages. The visual dubbing technologies may have the effect of significantly expanding the role of the localization houses, which may become responsible for the visual dubbing process in addition to the conventional audio dubbing process.

SUMMARY

According to aspects of the present disclosure, there are provided a computer-implemented method, one or more non-transient storage media carrying instructions for carrying out the method, and a system comprising at least one processor and at least one memory storing instructions which, when executed by the at least one processor, cause the at least one processor to carry out the method.

The method includes obtaining input video data depicting a scene comprising an object, and obtaining current values of a set of adjustable parameters of an object representation model comprising a neural network and arranged to generate, using the neural network, animated representations of the object in which a geometry of the object is controllable by the set of adjustable parameters. The method further includes, for a plurality of iterations, using the object representation model to generate a video layer comprising an animated representation of the object in which the geometry of the object corresponds to the current values of the set of adjustable parameters, presenting composite video data comprising the video layer overlaid on the object in the input video data, and updating the current values of the set of adjustable parameters in response to user input via the user interface.

By providing a user interface as described, the claimed method enables deep video editing whereby a user can tweak and edit the geometry (e.g. deformations and/or pose) of the object within the input video data and be provided with visual feedback on the effect of the edits, enabling an iterative and interactive editing process. For example, a user may apply corrections or other modifications to a visual dub generated automatically from an audio dialogue track.

The first method may further include, following the plurality of iterations, generating a finalized video layer comprising a finalized animated representation of the object in which a geometry of the object corresponds to the current values of the set of adjustable parameters. For example, the neural network may be a first neural network and generating the finalized video layer may use a second neural network. The finalized video layer may be at a higher definition than the video layers generated during the plurality of iterations.

By providing a lower-resolution model for the interactive iterations and a higher-resolution model for the finalization stage, the visual feedback provided via the user interface may be provided rapidly, for example in near-real-time, which may not practicable with available computing resources if the video layers at each iteration were generated at the higher resolution. By contrast, the finalized video layer may be generated at a resolution and quality comparable to a target output format, such as the format of a film.

Nevertheless, in other examples, the video layers at each iteration may be generated at the same or similar resolution to the finalized video layer, but additional stages such as additional compositing or visual effects (VFX) may be applied at the finalization stage.

In an example where a second object representation model is used to generate a finalized video layer, the second neural network may include a sequence of layers and the first neural network may include an initial subsequence of the sequence of layers. By providing a two-stage network of this form, the visual characteristics of the video layers generated at each iteration may be based on corresponding features to those at the finalization stage, allowing the user to be confident that the appearance of the object in the finalized video layer will be faithful to the appearance of the object presented in the user interface at the end of the iterative editing process. The first and second neural networks may be trained during a joint training process or may be trained separately from one another. Furthermore, the second neural network may have a different architecture to the first neural network. For example, the first neural network may be a compressed version of the second neural network generated using model compression. The second neural network may include the first neural network followed by one or more additional network components, such as one or more super-resolution networks for performing upscaling and/or one or more neural network modules for performing at least one of color grading, simulating motion blur, simulating camera focus, denoising, regraining, or other such effects. Such modules may be used to match the appearance of the finalized video layer with the appearance of surrounding regions of the scene as depicted e.g. in a deliverable version of a film.

The second neural network may be arranged to receive background video data comprising a background region of the input video data in a vicinity of the object, and generate the finalized video layer to include a reproduction and/or extension of the background region around the object. In this way, in cases where the geometry, position and/or orientation of the object changes so as to expose a region of the background hidden in the input video data, the neural network may synthesize a suitable and plausible portion of background. Alternatively, the method may include generating a separate background layer comprising a synthetic extension, beyond a boundary of the object, of a background region of the input video data, and the finalized video layer may include the finalized animated representation of the object overlaid on the generated background layer. Either of these methods of handling hidden background regions may also be used for video layers generated during the iterative editing process.

The second neural network may be arranged to generate a continuous alpha channel for blending the finalized animated representation of the object with a background region surrounding the object. In this way, hard borders between video data depicting the scene, and either the object or synthesized background region may be avoided, allowing more seamless compositing of the finalized video layer with the video data depicting the scene. Generating the finalized video layer may include blending the finalized animated representation of the object with the background region in accordance with the continuous alpha channel, or alternatively the finalized video layer may be provided with the additional alpha channel for performing the blending downstream.

The method may include obtaining test values of the set of adjustable parameters, using the second object representation model to generate a test video layer comprising a test animated representation of the object in which deformations of the object correspond to the test values of the set of adjustable parameters, and using the test video layer to determine values of a set of compositing parameters for use in compositing the finalized video layer with video data depicting the scene. The compositing parameters may include parameters of one or more neural networks trained to apply various compositing effects (for example in a sequential, modular fashion), to improve the quality of resulting finalized composite video. Examples of such effects that may be implemented using neural network modules include simulating motion blur, simulating camera focus, color grading, denoising, and/or adding noise/grain.

The method may include generating finalized composite video data comprising the finalized video layer composited with video data depicting the scene in accordance with the determined values of the set of compositing parameters, though in other examples the compositing parameters may be provided along with the finalized video data as a product. For example, providing video layers and associated compositing parameters may be a significantly more compact delivery format than providing a version of a film comprising composite video data, provided the receiving party or device has the necessary software to perform the compositing, particularly if multiple versions of the modified object are required (for example, corresponding to multiple language versions of a film). Alternatively, the finalized video layer may not be generated at all, and instead access to the object representation model and adjustable parameter values may be provided to a receiving party, along with, optionally, the values of the set of compositing parameters. The same object representation model may then be used at the receiver side to generate multiple finalized video layers, each corresponding to a respective set of the adjustable parameter values.

By determining values of compositing parameters based on a test animated representation (e.g. based on a test script), configuration of the compositing process may be performed independently of the animated representation in the generated video layers. In the case of visual dubbing of a foreign language film, this may remove the need for visually dubbed material to be returned to a post-production house after being generated at a localization house. The test values of the set of adjustable parameters may be designed to cover a wide range of possible geometries (e.g. deformations and/or poses) over a course of the second video data, such that the determined values of the compositing parameters may be appropriate for most or all possible modifications of the object within the input video data. In some examples, multiple sets of values for the compositing parameters may be determined, covering different regimes of modifications and/or different portions of the input video data.

The method may include generating mask data indicating a framewise occlusion of the object within the depicted scene. Generating the finalized video layer may then include overlaying video data comprising portions of the scene indicated by the generated mask data on the finalized animated representation of the object. In this way, occlusions of objects in the scene may be represented faithfully in the finalized video layer. This method of handling occlusions may also be used for the video layers generated during the iterative editing process.

The object representation model may include a three-dimensional object model controllable by the set of adjustable parameters, in which the neural network is trained to generate animated representations of the object based at least one part on a view of the three-dimensional deformable model. Alternatively, the object representation model may be embodied solely by a neural network model which takes values of the set of adjustable parameters directly as conditioning inputs. The three-dimensional object model may for example be a deformable model such as a three-dimensional morphable model. Alternatively, the object representation model may be embodied solely by a neural network model which takes values of the set of adjustable parameters directly as conditioning inputs The user interface may be presented on a computing device remote from the one or more processors and the one or more non-transient storage media. For example, the user interface may be embodied as a web application. In this way, the video editing functionality may be provided via a "software-as-a-service" model, making it possible to ensure that sufficient processing resources and infrastructure are available for performance, irrespective of the processing resources at the user device presenting the user interface, provided a sufficient network connection is available to end user device.

The object may be a human face, and obtaining the current values of the set of adjustable parameters may be based on an audio track containing speech. For example, determining the current values of the set of adjustable parameters may include obtaining a first audio track containing original speech by the human face and a second audio track containing alternative speech for the human face, tracking the human face within the sequence of image frames to determine base values for at least a subset of the set of adjustable parameters, using the first audio track to determine original speech values of at least a subset of the set of adjustable parameters, using the second audio track to determine alternative speech values of at least a subset of the set of adjustable parameters, and determining the current values of the adjustable parameters based at least in part on the base values, the original speech values, and the alternative speech values. For example, the current values may be determined as a linear combination in which the original speech values are subtracted from the base values, and the alternative speech values are added, which may result in the mouth movements of the face associated with the original speech being partially of fully replaced by mouth movements associated with the alternative speech, which is the desired effect for visual dubbing.

Determining the original speech values of the set of adjustable parameters may include determining a first sequence of visemes from the first audio track and mapping the first sequence of visemes to values of at least a subset of the set of adjustable parameters, and determining the alternative speech values of the set of adjustable parameters may include determining a second sequence of visemes from the second audio track and mapping the second sequence of visemes to values of at least a subset of the set of adjustable parameters. Visemes provide an intermediate representation of mouth shapes associated with sounds and are thus readily derivable from an audio track. Furthermore, the cardinality of the set of visemes may be significantly smaller than the cardinality of the set of blendshapes, and the visemes may be more readily interpretable to a human user.

Visemes may provide a suitable level of abstraction from the values of the adjustable parameters for efficient human interaction. In this regard, the method may include presenting, via the user interface and simultaneously with the composite video data a visual representation of a sequence of visemes corresponding to the current values of the set of adjustable parameters. The user input may indicate a modification of the sequence of visemes, for example a modification of an amplitude or timing of a viseme within the sequence of visemes.

Determining the first sequences of visemes may include processing the first audio track and a text representation of the original speech using a facial animation model, and determining the second sequences of visemes may include processing the second audio track and a text representation of the alternative speech using the facial animation model. Determining additional text representations may improve the accuracy of the audio-to-viseme mapping by providing additional semantic context or information.

The object may be a human face, and the method may include presenting, via the user interface and simultaneously with the composite video data a visual representation of a sequence of visemes corresponding to the current values of the set of adjustable parameters. The user input may indicate a modification of the sequence of visemes, for example a modification of an amplitude or timing of a viseme within the sequence of visemes.

According to further aspects of the present disclosure, there are provided a computer-implemented method of generating output video data, along with one or more non-transient storage media carrying instructions for carrying out the method and a system comprising at least one processor and at least one memory storing instructions which, when executed by the at least one processor, cause the at least one processor to carry out the method.

The method includes receiving, from a remote system, object data comprising values of a set of adjustable parameters of a respective object representation model for each object of a plurality of objects and compositing data indicating at least a respective trajectory of each of the plurality of objects relative to a reference frame. The method includes processing the object data and the compositing data using the respective object representation models to generate output video data depicting a scene comprising an animated representation of each object of the plurality of objects following the respective trajectory relative to the reference frame. For each object of the plurality of objects, the respective object representation model includes a respective neural network and is arranged to generate, using the respective neural network, animated representations of the object in which a geometry the object is controllable by the set of adjustable parameters.

Generating the output video data at receiver side as described above may reduce reliance on large volumes of video data being sent from the system(s) at which the object data and compositing data are generated to the receiver system, particularly if multiple versions of the output video data are required. The generating of the output video data and the generating of the object data and/or compositing data may for example be performed by different parties, using systems geographically remote from one another (for example, connected over a network). The receiver system may for example be operated by a distributor and may be arranged to receive multiple versions of the object data and/or compositing data corresponding to multiple versions of a film, from one or more localization houses and/or service providers. The receiver system may receive additional versions by receiving additional versions of the object data and/or compositing data. The reference frame may be fixed relative to image frames of the output video data and/or relative to a camera position. The trajectories of the objects may be defined with respect to a two-dimensional coordinate system (such as a coordinate system of the image frames) or a three-dimensional coordinate system (e.g. additionally indicating axial positions of the object with respect to a camera axis). The trajectory of a given object may be a moving trajectory or a stationary trajectory.

Generating the output video data may include using the respective object representation model and the values of the set of adjustable parameters for the respective object representation model for each object of the plurality of objects to generate a respective video layer depicting the animated representation of the object, and composing the generated video layers in accordance with the compositing data to generate the output video data.

Composing the video layers may include overlaying (e.g. blending) the video layers with one another, and optionally with input video data depicting at least part of scene. The input video data may for example include an original version of a scene and the output video data may include a modified version of the scene in which the visual appearance of certain objects has been modified. Accordingly, the method may include obtaining the input video data depicting at least part of the scene, and composing the generated video layers may include overlaying the generated video layers on the input video data. The input video data may be received from the same system as the object data and/or the compositing data, or may be obtained separately.

For a first object of the plurality of objects, the respective neural network may be arranged to receive a portion of the input video data depicting a region of the scene, and generate the respective video layer to include a reproduction and/or extension of the region of the scene around the animated representation of the first object. In this way, in cases where the geometry, trajectory and/or orientation of the first object changes so as to expose a region of the background hidden in the input video data, the neural network may synthesize a suitable and plausible portion of background. Alternatively, the method may include generating a separate background layer comprising a synthetic extension, beyond a boundary of the first object, of a background region of the input video data, and the generated video layer may include the finalized animated representation of the object overlaid on the generated background layer.

For the first object, the respective neural network may be arranged to generate a continuous alpha channel for blending the reproduction and/or extension of the region of the scene with the input video data. In this way, hard borders between the input video data, and either the object or synthesized background region may be avoided, allowing more seamless compositing of the respective video layer with the input video data.

The scene may include a depiction of a first object of the plurality of objects, and the method may include obtaining mask data indicating an occlusion of the depiction of the first object in the scene, and generating the respective video layer for the first object may include overlaying part of the input video data indicated by the mask data on the animated representation of the first object. In this way, occlusions of objects may be represented faithfully in the output video data.

The compositing data may indicate a depth-wise order of the plurality of objects, and generating the respective video layers may be performed sequentially from a rearmost object of the plurality of objects to a foremost object of the plurality of objects. By generating (and optionally composing) the respective video layers in this way, any synthetic background generated as part of a given video layer properly represents animated representations of object(s) in video layers behind the given video layer.

For a first object of the plurality of objects, generating the respective video layer may include modifying a visual appearance of the respective animated representation of the first object in accordance with the compositing data. In this way, the output video data may be generated to have a consistent visual appearance as indicated by the compositing data. The compositing data may for example include information regarding camera parameters (such as focal length and/or lens parameters), depth information, color information, lighting information (such as location and characteristics of one or more light sources), and/or information pertaining to noise or grain (such as parameters for generating Perlin noise). Any of this information may be used to modify the visual appearance, for example to simulate camera focus effects, motion blur, grain, or other effects that may be present in a video depiction of a scene.

Modifying the visual appearance of the respective animated representation of the first object may include processing the respective animated representation of the first object using one or more neural network modules trained to perform at least one of upscaling, color grading, simulating motion blur, simulating camera focus, denoising, and regraining. The parameters may include trainable parameters and/or conditioning parameters of the one or more neural network modules.

The compositing data may include at least one of lighting information indicating at least one characteristic of lighting for scene, and camera information indicating one or more parameters of a camera. Generating the output video data may then include providing, to the respective object representation model for each of the plurality of objects, said at least one of the lighting information and camera information. By providing the respective object representation models with scene-level camera information and/or lighting information (for example as parameter values for a three-dimensional object model and/or a neural network component of the respective object representation model), the object representation model may generate animated object representations which plausibly recreate lighting effects such as shadows and/or effects associated with the camera such as focus/defocus and perspective distortion.

For a first object of the plurality of objects, the respective object representation model may include a three-dimensional model controllable by the set of adjustable parameters. The respective neural network may be trained to generate animated representations of the first object based at least in part on a view of the three-dimensional model.

For each object of the plurality of objects, the object data may include a respective indicator for the respective object representation model in a database of object representation models, and the method may include accessing the respective object representation model in the database using the respective indicator. The database may be local or remote, and may also be accessible to a party responsible for training the respective neural networks of the object representation models. The database may for example include object representation models for a large number of objects or versions of objects, enabling a range of scenes or versions of scenes to be generated at the receiver side with relatively little reliance on video data being transmitted from the party generating the object data and/or the compositing data.

The object data may be first object data comprising first values of the set of adjustable parameters of the respective object representation model for each object of the plurality of objects, and the output video data may be first output video data. The method may then include obtaining second object data including second values of a set of adjustable parameters of the respective object representation model for each object of the plurality of objects. The method may include processing the second object data and the compositing data, using the respective object representation model for each of the plurality of objects, to generate second output video data depicting a modified version of the scene. The second object data may be received from the same remote system as the first remote system or may be received from another remote server, or generated locally. The second object data may include some of the same data as the first object data, with variations from the first object data being obtained for example as a delta to the first object data. Multiple versions of the output video data may thus be generated with a small volume of additional data being required. For example, one or more objects of the plurality of objects may correspond to human faces, and different versions of the output video data may correspond to different dialogue versions.

The method may include receiving a request for the output video data, the request indicating a video format for the output video data video format. Generating the output video data may then include generating the output video data to have the indicated video format. In this way, different versions of the output video data may be generated at the receiver side upon request without having to send multiple versions of the output video data from the remote system. For example, the request may indicate a frame rate and/or resolution for the output video data. The request may be a user request or a machine-generated request.

The method may further include transmitting the output video data to a device configured to display the output video data. Alternatively, the method may include displaying the output video data via a display.

Further features and advantages will become apparent from the following description of preferred embodiments of the invention, given by way of example only, which is made with reference to the accompanying drawings.

DETAILED DESCRIPTION OF CERTAIN INVENTIVE EMBODIMENTS

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the case of explanation and understanding of the concepts underlying the examples.

Embodiments of the present disclosure relate to modifying objects in film. In the present disclosure, film may refer to any form of digital video data or audio-visual product. In particular, embodiments described herein address challenges related to modifying objects in film subject to constraints of a filmmaking pipeline. The technology disclosed herein provides methods relevant to tasks such as visual dubbing of foreign language films, performance transposition to avoid reshooting of scenes, and modification of background objects within a film.

Figure 1:
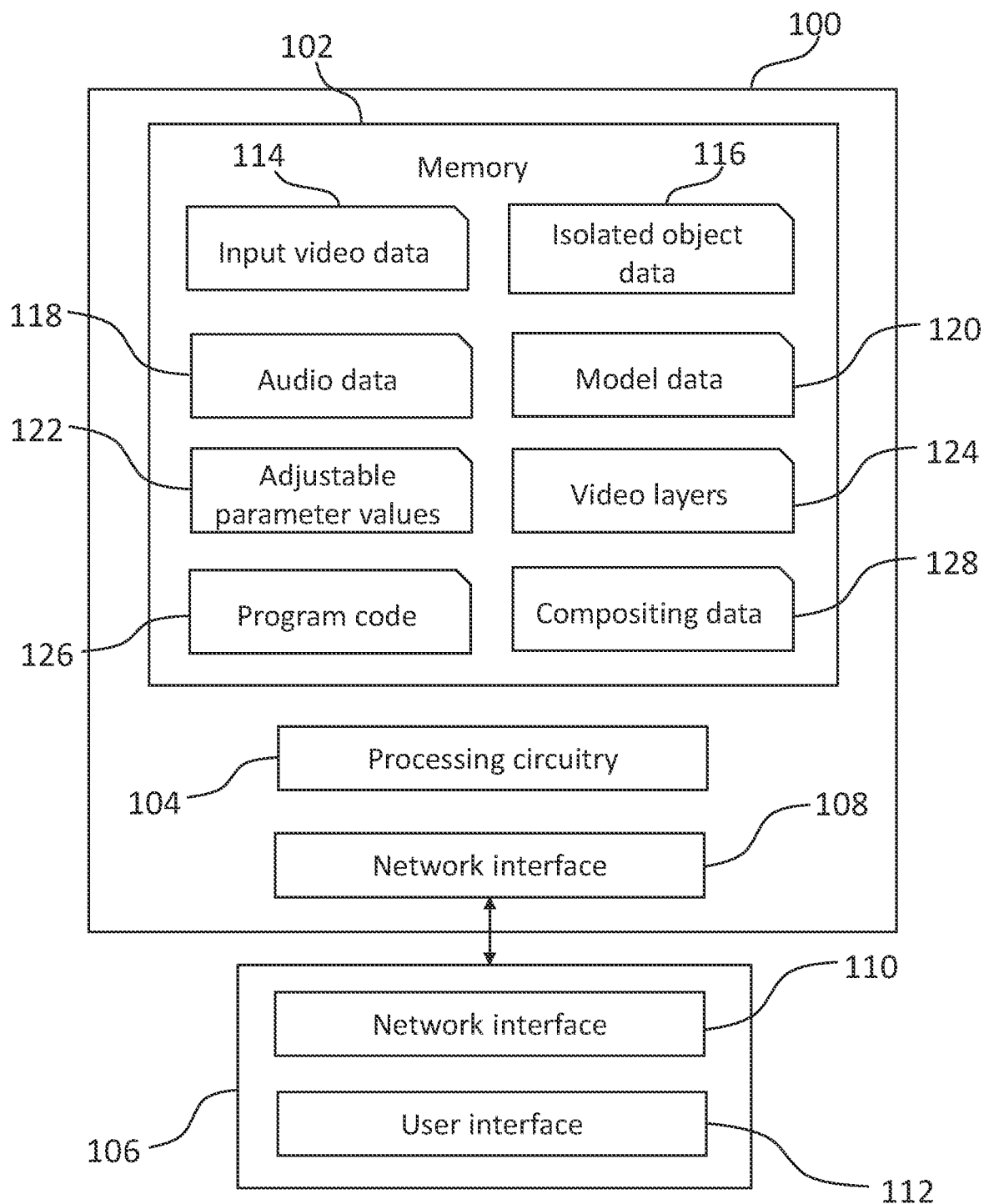
FIG. 1 shows schematically a data processing system arranged in accordance with examples.

FIG. 1 schematically shows a data processing system 100 in accordance with examples. The data processing system 100 may be a single device such as a server computer or may include multiple devices, for example multiple physical or virtual server computers or components connected via a network to provide cloud-based services. The data processing system 100 includes memory 102, which in the present disclosure refers both to non-volatile storage and to volatile and non-volatile working memory. The memory 102 is communicatively coupled to processing circuitry 104, which may include any number of processing units such as a central processing unit (CPU), a graphics processing unit (GPU), a neural processing unit (NPU) or neural network accelerator (NNA), one or more application specific integrated circuits (ASICs), a digital signal processor (DSP), and so on.

The system 100 in this example is arranged to communicate with a remote system 106 over a network (not shown) via respective network interfaces 108, 110. The remote system 106 includes a user interface 112 which comprises a graphical user interface along with input and output devices. In this example, the remote system 106 has access to an interactive software tool, either via a browser (e.g. as a web application) or via a dedicated application running on the remote system 106, enabling a user of the remote system 106 to view and modify and edit video data generated by the data processing system 100. In this example, the data processing for modifying video data is performed at the data processing system 100 rather than the remote system 106, meaning that the remote system 100 can be any system or device with a sufficient network connection and graphics capabilities. The data processing system 100 is typically (though not necessarily) operated by a different commercial entity to the remote system 106. For example, the data processing system 100 may be operated by a service provider responsible for providing infrastructure, software, and support for implementing the technical methods described hereinafter, whereas the remote system 106 may be operated by a party involved in a creative process of editing film according to the method described herein, for example a localization house responsible for creating a secondary language version of a film The memory 102 of the data processing system 100 is arranged to store various data for implementing the methods described hereinafter. In particular, the memory 102 may store input video data 114 comprising sequences of image frames, where a sequence of image frames may correspond to raw and/or processed video footage captured by one or more cameras. The input video data 114 may for example include picture rushes captured during a production of a film, and/or may include compressed or otherwise processed footage. The input video 106 may for example be stored in ProRes 4444 format or a similar high-resolution delivery format, though may additionally be transcoded to a lower resolution format. The memory 102 may further store isolated object data 116 comprising isolated instances of one or more objects appearing within the input video data 114. In the present disclosure, an instance of an object may broadly refer to an uninterrupted appearance of the object within a sequence of image frames. For example, in a given scene of a film, an object may appear within a first sequence of image frames, then be occluded or move outside the field of view camera for a second sequence of image frames, then reappear later in a third sequence of image frames, in which case two instances of the object may be recorded. The isolated object data 116 may include sequences of image frames, or portions of image frames, extracted from the input video data 114. The isolated object data 116 may further, or alternatively, include a registered portion of each image frame in which the instance appears, for example a bounding box which may be resized, rotated and/or stabilized. The registered portions of the image frames may be stored in EXR format, which a high-dynamic-range multi-channel image file format.

The memory 102 may further store audio data 118 comprising an original soundtrack associated with the input video data 114. The soundtrack may include a music and effects track and a primary dialogue track, which may for example include primary language dialogue. The audio data 118 may further include one or more secondary dialogue tracks, which may for example include dialogue associated with one or more secondary languages (i.e. one or more languages different to the language spoken by the actors in the initial shoot of a film) and/or dialogue associated with a reshoot of one or more scenes.

The memory 102 may further store model data 120 encoding one or more object representation models. An object representation model may be used to generate a visual representation of an object, such as an object appearing in the input video data 114, in dependence on values of a set of adjustable parameter values 122. An object representation model may include a neural network trained to generate animated representations of an object, such as photorealistic animated representation of an object, in which aspects of the appearance of the object are controllable by the set of adjustable parameters. The object representation model may for example include a combination of a deformable object model and a neural renderer, where the neural renderer is trained to generate photorealistic representations of the object in dependence on rendered images of the deformable object model. In other examples, the object representation model may omit a deformable object model and instead may comprise a neural network trained to generate photorealistic representations of the object in which values of the set of adjustable parameters characterizing aspects of the appearance of the object are provided directly as conditioning inputs to the neural network.

The model data 120 includes neural network data corresponding to one or more neural networks. The neural network data may define all aspects of the neural network models required for training and subsequent processing of data by the neural networks. The neural networks may for example encode network architectures, hyperparameter values, trainable parameter values, training routines, definitions of training objectives, and so on. Trainable parameter values may be learned in dependence on the input video data 114 and potentially other data as will be explained in more detail hereinafter. The system 100 may use the one or more neural networks for, among other tasks, rendering photorealistic representations of objects. Such neural networks may be referred to as neural renderers and may form part of the entirety of an object representation model, depending on implementation. In some examples, a neural renderer may have two multiple output layers for generating photorealistic representations of objects at respective different resolutions. For example, low resolution representations may be generated at a relatively low computational cost, enabling such representations to be generated in near-real-time in response to changes to adjustable parameter resulting from user input via the user interface 112. By contrast, high resolution representations may take more time and computational resources to generate, but may be of comparable resolution and visual quality to a deliverable version of a film. The system 100 may further use one or more neural networks for compositing tasks in which animated representations of an object generated by a neural renderer are modified so that aspects of the appearance of the animated representations are consistent with the appearance of other objects in the input video data 114. Examples of such compositing tasks include simulating motion blur, simulating camera focus, color grading, denoising, and/or adding noise/grain.

In examples, an object representation model may include a deformable object model such as such a three-dimensional morphable model (3DMM). The deformable object model may be renderable, for example using rasterization and/or raycasting methods, resulting in video data comprising image frames in which the deformable object model can exhibit various poses and deformations. The deformable object model may correspond to a particular class or type of object, and may have adjustable parameters that have different values corresponding to different objects within the class, and/or for different instances of a given object within the class. For example, a deformable object model for the class of "human faces" may be capable of representing a range of human faces, and also a range of orientations, facial expressions, and so on, by specifying values for the adjustable parameters of the deformable object model. The deformable object model may comprise a mesh model formed of polygons such as triangles and/or quadrilaterals each having respective edges and vertices. The adjustable parameters of the deformable object model may include frame-independent parameters and frame-dependent parameters. Values of the adjustable parameters corresponding to a particular instance of an object may be determined for example by processing the relevant portions of the input video data 114 using an object tracker. An object tracker may for example detect and localize an instance of an object within the input video data 114 and determine locations (in two or three dimensions) of predetermined key points on the object, which may be matched with locations of corresponding key points on the object model. Various types of object tracker are known in the art, for example based on convolutional neural networks or other machine learning models, or other computer vision techniques. Different object trackers may be used to determine values of adjustable parameters for different types of object within the input video data 114.

The frame-independent parameters of the object representation model may encode characteristics of the object which are not expected to change (or which can reasonably be modelled as not changing) between image frames, whereas the frame-dependent parameters may encode characteristics which may change between image frames. The frame-independent parameters may include base parameter values for encoding a base geometry of the object treated a starting point to which deformations are applied (for example, a geometry of a face with a neutral expression). The base geometry may include, for example, positions of a set of vertices for a mesh model. In addition to the base parameters, the frame-independent parameters of the deformable object model may include parameters encoding a reflectance model for the surface of the object (and/or other surface characteristics of the object), along with intrinsic camera parameter values for projecting the deformable object model to an image plane. The reflectance model may for example treat the surface of the object as a perfect diffuse surface that scatters incident illumination equally in all directions. Such a model may be referred to as a Lambertian reflectance model. The inventors have found this model to achieve a reasonable trade-off between complexity and realistic results. However, other reflectance models may be incorporated without departing from the scope of the present disclosure.

The frame-dependent parameters of the deformable object model may include pose parameters encoding a position and/or orientation of the model with respect to a virtual camera, and deformation parameters for example encoding adjustments applied to the base geometry of the model, thereby causing the model to exhibit different appearances, for example different facial expressions and mouth movements in the case of a human face, or different body shapes in the case of a human body. The pose parameters may encode a position of the model in three-dimensions and rigid rotations about three axes (i.e. Euler angles), or in other words may include six degrees of freedom, though this is not essential. The deformation parameters may for example control deformations of respective vertices of a mesh. Alternatively, the deformation parameters may control weightings for a linear combination of a predetermined set of principal components referred to as blendshapes, where each blendshape corresponds to a specific global deformation of the base geometry. A blendshape many correspond to deformations over the entire set of vertices, or may correspond to deformations over a specific subset of vertices (in which case the blendshape may be referred to as a delta blendshape). For example, a delta blendshape may control vertices associated with a mouth shape, but may have no effect on vertices associated with eyes. By specifying particular weightings, the linear combination of blendshapes may be capable of expressing a wide range of deformations to the base geometry.

The frame-dependent parameters may additionally include parameters encoding a position and/or orientation of the object with respect to a given reference frame, along with a lighting model characterizing the irradiance of the object at a given point. The lighting model may for example model the illumination at a given point on the surface of the object using a predetermined number of spherical harmonic basis functions (for example, the first three bands L0, L1, L2 of spherical harmonic basis functions). The combination of the reflectance model and the lighting model enable the irradiance at a given point on the surface of the object to be modelled in dependence on a set of parameter values to be determined during model fitting. Other examples of lighting models and reflectance models are possible.

Examples of deformable object models for human faces include the Surrey Face Model, the Basel Face Model (BFM), the Large Scale Facial Model (LSFM), the Albedo Morphable model, and Faces Learned with an Articulated Model and Expressions (FLAME). Examples of deformable object models for human bodies include the Spare Trained Articulated Human Body Regressor (STAR) model and the Skinned Multi-Person Linear (SMPL) model.

In the above examples, a base geometry (or identity) of an object model may be determined by tracking one or more instances of an object across multiple image frames of the input video data 114. In another example, the base shape of a deformable object model may be independent of any footage of the object, and instead may have a generic geometry. In this case, any of the deformable object models discussed above may be used, with base parameter values corresponding to a predetermined or default base geometry. However, in this case, other deformable object models may also be available as the requirement to modify the base geometry is lifted. For example, three-dimensional synthetic models of humans, sometimes referred to as metahumans, have been developed for use as avatars in the metaverse. Commercial software packages have been developed for generating high-fidelity controllable three-dimensional models of human faces and/or bodies, such as MetaHuman Creator® by Epic Games®. In cases where a deformable model has a generic base shape, the identity of the rendered object representation (e.g. the identity of a specific human) may be determined primarily by the neural renderer, in which case the neural renderer may perform domain transfer from the domain of images of the generic base shape to the domain of images of a target object. Methods of training a neural renderer to perform domain transfer in this way are described in U.S. patent application Ser. No. 17/846,997, the entirety of which is incorporated herein by reference.

While in the examples above describe deformable object models, in other examples an object model may be a rigid object model. Furthermore, modifications to the appearance of an object in accordance with the present disclosure may involve changing the position, orientation, color properties of the object, in addition to or instead of deforming the geometry of the object.

The memory 102 may further store one or more video layers 124 including animated representations of objects as generated by the object representation models encoded by the model data 120. A video layer or video component may include video data comprising a sequence of image frames to be overlaid on (e.g. blended with), or otherwise combined with a sequence of image frames of the input video data 114 to generate output video data. The video layers 124 may for example be stored in EXR format, to be overlaid on portions of the input video data 114 at framewise locations indicated by the isolated object data 116, to generate composite video data. In addition to one or more color channels, the video layers 124 may include one or more channels for use in overlaying or compositing the video layers 124 onto the input video data 114. For example, the video layers 124 may include a continuous alpha channel including pixelwise values for use in blending a given video layer with a given portion of input video data.

The memory 102 may further store program code 126 comprising routines for implementing the computer-implemented methods described herein. The routines may enable automated implementations of certain aspects of the processing described herein, and/or may enable user input to control various aspects of the processing. The program code 126 may for example define a software tool to enable users to perform deep editing of objects in video data, for example via the remote system 106 and/or via a user interface of the data processing system 100 (not shown).

The memory 102 may further store compositing data 128, for use in compositing video layers generated by the system 200 with the input video data 114 and/or with one another. In the present disclosure, compositing may involve combining one or more video layers (such as synthetically generated video layers and/or original video data such as the input video data 114), to generate composite video data. The compositing data 128 may include, for a given instance of an object, one or more timestamps or other temporal indicators indicating where in a timeline of the input video data 114 the instance of the object appears, along with position data indicating a trajectory (such as a framewise position) of the object in the input video data 114. The position of an object indicated at a given instant in time may be a two-dimensional position within the input video data 114, or may be a three-dimensional position (e.g. containing a depth value) within a scene depicted in the input video data 114.

Compositing may include modifying the appearance of video layers so as to have consistent visual qualities so that they can be seamlessly combined with one another to generate realistic composite video data. The compositing data 128 may include data for use in modifying the appearance of the video layers for this purpose. For example, the compositing data 128 may include values of compositing parameters, which may apply to one, some, or all objects within a given scene. The compositing parameters may include, for example, camera parameters such as camera focal length and lens parameters, parameters relating to lighting, color, grain, and so on. Such parameters may be known or may be determined or estimated using one or more object trackers. An object tracker may for example be trained to estimate such parameters using supervised training with synthetic training scenes for which such parameters are readily available. The compositing data 128 may further include parameters of one or more neural networks for use in performing compositing processes, and/or may include data to be provided as inputs to such neural network models, as will be explained in more detail hereinafter.

Figure 2:
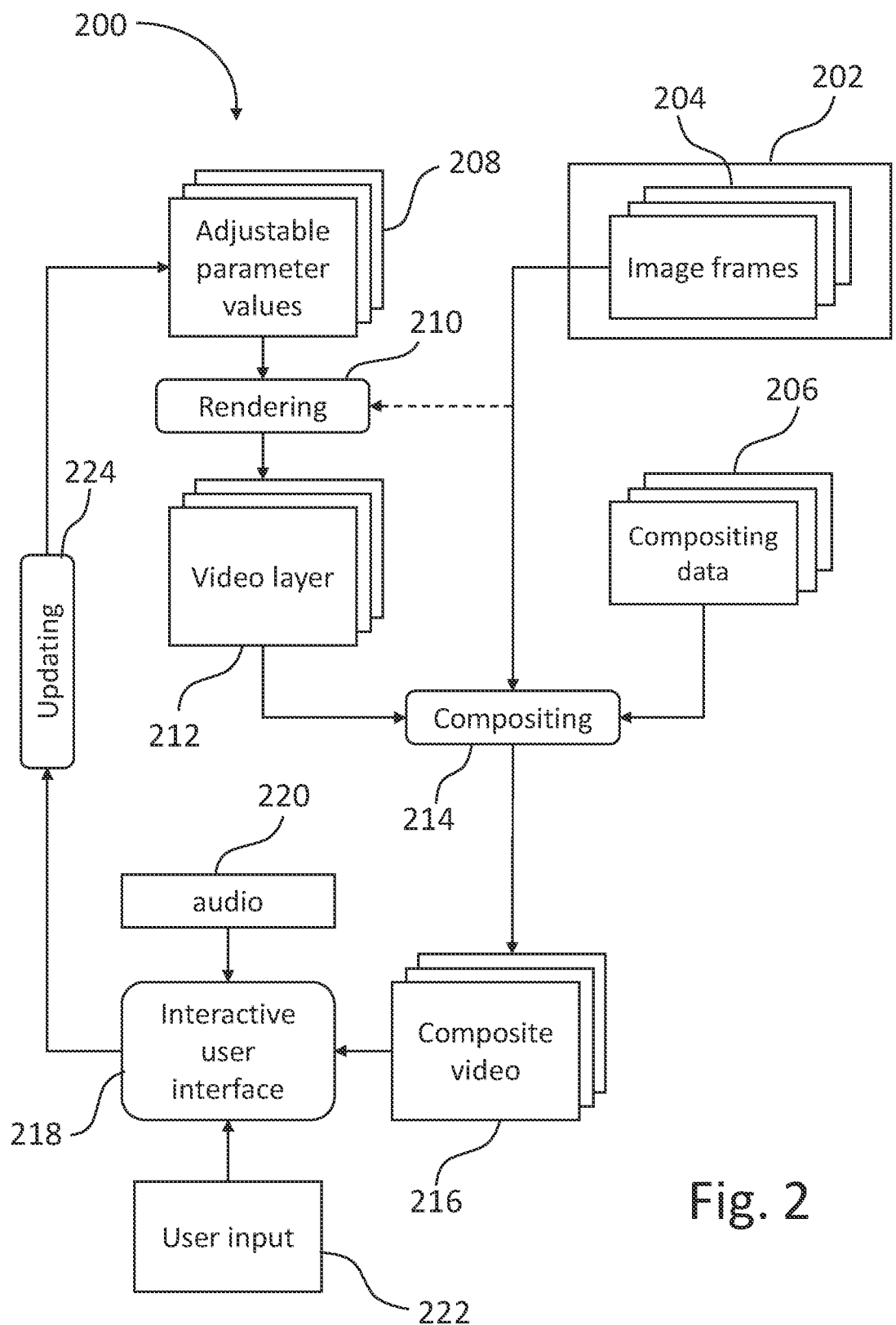
FIG. 2 shows schematically a method of processing video data in accordance with examples.

FIG. 2 shows a method 200 of processing input video data 202 comprising a sequence of image frames 204, according to examples. The sequence of image frames may correspond to footage from a scene, or part of a scene, from a film. The method may be performed by any suitable data processing system, for example the data processing system 100 of FIG. 1. Prior to the method of FIG. 2 taking place, the footage may optionally be downsized, transcoded, compressed and/or converted to a common format. For example, the footage may be converted to a 2K format (i.e. a format in which the horizontal dimension is approximately 2000 pixels). In this way, the format of the input video data 202 (including e.g. the resolution, pixel depth, color format) may be matched to a prescribed format for the processing described hereinafter. Downsizing the footage may significantly reduce the computational cost of the processing operations described hereinafter. During a conventional filmmaking process, this process is typically performed in order to generate lower volumes of data for handling during the offline editing process. The input video data 202 may be the same data used for offline editing. Furthermore, prior to the method 200 being performed, one or more neural renderers may be trained to generate representations of one or more objects based on values of a set of adjustable parameters of one or more object representation models. Details of possible training processes are described in more detail hereinafter. As part of the training process, or separately, the input video data 202 may be processed to generate compositing data 206 for use in compositing video layers to generate composite video data. The compositing data 206 may indicate at least a framewise position, scale, and/or orientation of an object appearing in the sequence of image frames 204, and may encode various other information as discussed above in relation to FIG. 1 The compositing data 206 may be generated at least in part using one or more object trackers. Adjustable parameters values 208 of an object representation model may also be determined as a result of object tracking and/or via additional processes. The adjustable parameter values 208 may correspond to an appearance of the object within the sequence of image frames 204, or may include a modification of one or more aspects of the appearance of the object. Deformations of the object may be encoded by a subset of the adjustable parameter values 208 as discussed above. In one example, the sequence of image frames 204 includes footage of an actor performing primary dialogue, and the adjustable parameter values 208 correspond to the actor performing secondary dialogue. In this example, the adjustable parameter values 208 may be determined by processing video data and audio data as described in detail with reference to FIG. 3.

The method 200 proceeds with rendering, at 210, an animated representation of the object using the object representation model and the adjustable parameter values 208. The animated representation may be stored on one or more channels of a video layer 212, along with, optionally, additional channels for use in overlaying or compositing the video layer 212 or otherwise modifying the video data, for example a continuous alpha channel which may also be generated by the object representation model as discussed in more detail hereinafter. Optionally, the video layer 212 may include synthetic background data for a region surrounding the object, either on the same channel(s) or on different channel(s) to the animated representation of the object. For example, the object representation model may include a neural renderer configured to process portions of the input video data 202 showing a background region in a vicinity of the object, and the resulting animated representation of the object may include a synthetic reproduction and/or extension of the background region around the object. Alternatively, a separate neural network model or other machine learning model may be trained to generate a background layer comprising a synthetic extension the background region beyond a boundary of the object appearing in the input video data, and this background layer may be provided on separate channel(s) to the animated representation of the object, or may be fused with the animated representation of the object for example based on values of an alpha channel. Generating synthetic background data enables inpainting to be performed such that gaps resulting from changes in geometry of the object are filled plausibly and consistently with the input video data.

At first instance, the rendering 210 may be performed by a low-resolution output of a multi-output neural renderer. In this way, the rendering 210 may be performed relatively quickly, for example in a matter of a few seconds, a few tenths of a second, or a few hundredths of a second for a sequence of image frames to be rendered. As explained in more detail hereafter, this may facilitate responsive, interactive object editing.

The method 200 continues with compositing, at 214, the video layer 212 with the input video data 202, in accordance with the compositing data 206, to generate composite video data 216. The composite video data 216 may take the form of a "slap comp", in which the video layer 212 is straightforwardly overlaid on the input video data 202 at a location and orientation indicated by the compositing data 206, optionally using an alpha channel associated with the video layer 212 to determine which pixels of the video layer 212 are overlaid or blended with the input video data 202.

The composite video data 216 may be displayed via an interactive user interface 218 (which may correspond to the user interface 112 of FIG. 1). The user interface 218 may display the composite video data 216 at its intended frame rate, or in slow motion, or on a frame-by-frame basis, and may provide the user with controls to switch between these display modes. The user interface 218 may additionally be provided with audio data 220 to be played alongside the composite video 216. The audio data 220 may for example include a music and effects track associated with the video data 202, along with a secondary dialogue track corresponding to the adjustable parameter values 208.

The user interface 218 may provide a user with controls to enable aspects of the appearance of the object to be modified or adjusted in response to user input 222. In particular, the user interface 218 may provide controls to enable the user to adjust values of a set of deformation parameters and/or pose parameters for the object appearing in the video layer 212. In one example, the user may be provided with controls to progressively transition or interpolate between an original appearance of the object and a target modified appearance of the object (e.g. a modified appearance corresponding to the adjustable parameter values 208). In certain applications, it may be desirable to leave the object unmodified or minimally modified for certain portions of the input video data, and only induce significant modifications for other portions of the input video data, for example where there is a significant difference between the original appearance and the target modified appearance, at which point there may be a perceptible deviation or lack of synchronization between the original appearance of the object and a secondary audio track. In some examples, the interpolation may be performed automatically, for example in dependence on an audio track or in dependence on a magnitude of deviation between the original and target modified appearances of the object.

In an example where the deformation parameters correspond to a set of blendshapes or delta blendshapes, the controls may enable the user to adjust the values of the deformation parameters directly, or alternatively via an intermediate representation which is designed to be readily interpretable by the user. For example, a mapping may be provided between different representations of the adjustable parameter values 208, such as between a set of blendshapes and a set of visemes. A viseme characterizes the deformation of a face or mouth for a given speech sound. The concept of a viseme is closely related to the concept of a phoneme, where a phoneme characterizes different speech sounds. Certain speech sounds may correspond to the same or similar mouth shapes, and therefore the number of possible visemes may be less than the number of possible phonemes. The number of visemes in the set of visemes may be significantly less than the number of blendshapes in the set of blendshapes. For example, the set of blendshapes may include hundreds or thousands of blendshapes, whereas the set of visemes may include between 15 and 20 visemes. The exact set of visemes used for the viseme representation, and the corresponding mapping, may depend on factors such as the language of speech. In an example, the user may be provided with a graphical representation of a sequence of visemes corresponding to speech within the composite video 216. For a given frame of the composite video 216, one or more visemes may be present (e.g. as a combination or superposition), and the user interface 218 may indicate amplitudes of the one or more visemes. The amplitude of the visemes may vary smoothly between frames, though this is not necessarily the case. The user input 222 may indicate an adjustment of the amplitude of a viseme, which may apply to a single frame or to a sequence of frames. For example, a user may adjust the amplitude of a given viseme using a slider or other control, or by explicitly providing a new amplitude value for the viseme. The adjustment may be performed on a frame-by-frame basis, or may be applied simultaneously to a sequence of frames (for example, adjusting the amplitude for a selected frame or sequence of frames may automatically adjust the amplitude of the viseme in preceding and following frames, such that a smooth transition between visemes is retained. Alternatively, or additionally, the user may adjust a timing of one or more viseme sequences. For example, if the user determines that the deformation of the object is not synchronized with the audio 220, the user may drag, extend, compress, or otherwise modify the timing of a sequence of visemes until synchronization is achieved. It may be particularly important, for example, to synchronize a plosive sound uttered in the audio 220 with a closed mouth viseme.

In some examples, the user interface 218 may display, either automatically or in response to a request from the user, information regarding a confidence in the quality of the animated object representation. This information may be represented as a numerical confidence score or as a visual representation such as a graph of confidence against a timeline of the video sequence. The information may include visual indicators to attract the user's attention to certain image frames where further modification is likely to be required. In order to determine confidence data for this purpose, the animated object representation may be compared with a target audio track (for example, a secondary dialogue audio track), for example by tracking the animated object representation, determining a corresponding sequence of visemes, and comparing the determined sequence of visemes with a sequence of visemes determined from the target audio track. Confidence data may also depend on the inherent quality of the neural rendering output, which may be estimated by other means, for example via an output of the neural renderer or using a discriminator similar to the type used to adversarially train a neural renderer.

The method 200 continues with updating, at 224, the adjustable parameter values 208 in response to the user input 220. In some examples, the updating may be performed automatically in response to the user input (e.g. in substantially real-time). In other examples, the updating may be performed in response to the user providing further input to submit or effect a set of changes. For example, a user may provide input to adjust an amplitude and/or timing of one or more visemes, then press a button in the user interface to enable the changes. The updating step may include mapping the user input to updated values of the adjustable parameters, for example mapping an updated viseme sequence to values of the adjustable parameters.

The method 200 continues with rendering 210 a new video layer 212 corresponding to the updated adjustable parameter values 208, and compositing 214 the new video layer 212 with the image frames 204 to generate new composite video 216. The new composite video data 216 is displayed via the user interface 218, enabling the user to view the effects of the adjustments. This process repeats, enabling the user to iteratively update the composite video data 216 until the user is satisfied with the appearance of the object being modified, and the synchronization of the object with the audio 220. The process of generating the updated composite video data 216 in dependence on user input 222 may be performed rapidly, for example in sub-second time at each iteration, facilitating near-real-time video editing. In some examples, the rapid updating may be assisted by provision of a low-resolution object representation model and low-resolution version of the image frames 204. The time taken per iteration may further be reduced by performing simple compositing (e.g. slap compositing) and omitting additional steps which may be necessary for achieving a realistic/seamless output (as discussed in more detail hereinafter). Finally, the processing described above may be performed at a server remote from the user device, as shown for example in FIG. 1, thereby minimizing any dependence on processing resources at the user device and enabling the commercial entity operating the server to ensure suitable resources and infrastructure are available for performing suitable effects.

Once the user is satisfied with the appearance of the object in the composite video data, the user may select an option within the user interface to finalize the video editing process. Selecting this option may initiate a finalizing process, which may correspond to a final iteration of the method 200 in which the rendering 210 may be performed using a different object representation model to that used in the previous iterations. In particular, the rendering 210 in the final iteration may be performed using a neural renderer configured to generate a higher-resolution output than the neural renderer used in previous iterations. The same adjustable parameters may be used for the high-resolution object representation model as for the low-resolution object representation model. For example, both models may include a common deformable model and differ only in using different neural renderers. Alternatively, a mapping may be established between adjustable parameters of the low-resolution object representation model and adjustable parameters of the high-resolution object representation model. In any case, the adjustable parameter values 208 determined through user input 222 at the interactive user interface 218 may be used directly or indirectly to control the high-resolution object representation model used in the finalizing stage.

In an example, different neural renderers are used in the finalizing stage and the interactive editing stage. The different neural renderers may have different architectures and/or may have been trained separately from one another. Alternatively, the low-resolution neural renderer used in the interactive editing may include a subset of layers of the high-resolution neural renderer used in the finalizing stage. In this case, the two neural renderers may have been trained in a joint training process, as will be explained in more detail hereinafter.

During the finalizing process, a high-resolution finalized video layer may be generated for compositing with high-resolution versions of the image frames 204 (for example, image frames at a suitable resolution for a deliverable version of a film). Whereas the compositing 214 during the earlier iterations of the method 200 may use a relatively simple compositing process (e.g. a slap comp), the compositing of the finalized video layer with the high resolution image frames may be considerably more complex, reflecting the fact that the resulting composite video data may become part of a deliverable version of a film. In some examples, the compositing during the finalizing process may be performed using additional portions of compositing data 206 determined in a pre-compositing process as discussed below.

In the pre-compositing process, a high-resolution test animated representation of an object to be modified may be generated using the same object representation model as used for generating the finalized video layer. The appearance (e.g. geometry) of the test animated representation may be based on one or more sets of test values of the adjustable parameters. The test values may be determined to cover a broad range of possible appearances of the object over the relevant sequence of image frames. The test values may be selected or determined to cover a broad range of scenarios within a range of plausible scenarios for modifications of the object within the sequence of image frames. For example, in the case of visual dubbing of a human face, a first set of test values may correspond to the human face with a wide open mouth throughout the sequence of image frames. A second set of test values may include values corresponding to the human face with a closed mouth throughout the sequence of image frames. In another example, the test values may be chosen according to a space-filling design to cover a maximal range of appearances of the object within given bounds over the course of the sequence of image frames. The test values may be determined for example by tracking footage of a human user reading a test script, or based on a mapping from a sequence of visemes, or any other suitable method.

Compositing of the test animated representation with the high-resolution video data may be performed, for example in a manual, automated, or semi-automated fashion, resulting in test composite video data. VFX and other finishing processes may be performed as part of the compositing process. These processes may include, for example, soft masking, color grading, in-painting, out-painting, addition or simulation of blur (e.g. motion blur), camera focus, and/or noise (such as Perlin noise) for simulating grain effects in the input video data, all of which may be controllable by the compositing data 206 and other data such as VFX data and/or finishing data. At least some of these processes may be performed by respective neural networks or neural network modules, in which case the compositing data 206 may include parameters associated with these neural networks, for example trainable parameters and/or conditioning parameters of the neural network(s). One or more neural networks may for example be arranged in sequence to apply, in a modular and cumulative fashion, effects to image frames (or sequences of image frames) generated by the neural renderer or object representation model. Any of these neural networks may be implemented as diffusion networks, transformer networks, encoder-decoder networks, or using any other suitable network architecture. Some of the neural networks may take additional inputs. For example, a neural network for simulating camera focus may use depth information such as depth maps and/or camera intrinsic parameters, which may be known or may be inferred, for example during the object tracking process. A neural network for simulating motion blur may take as input one or more of a frame rate, a shutter angle, motion vectors and/or optical flow. Some of these inputs (such as frame rate) may be known, whereas others (such as motion vectors or optical flow) may be determined e.g. from motion of the object model or by analysing image frames of a generated video layer. Values of the set of compositing parameters, and other compositing data, may be adjusted until approved, for example by a human user or automated quality testing process. In cases where the compositing parameters include trainable parameters of one or more neural networks, adjusting the compositing parameters may include further training the neural network. In some examples, multiple sets of values of the compositing parameters may be determined.

For example, different sets of values may be determined for different temporal portions of the video data, and/or for different object appearance regimes, such as different regimes of values for the adjustable parameters. The number of necessary sets of values may be determined automatically or manually.

Once approved, for example by a human user or an automated process, the compositing data 206 may be stored for use in compositing the finalized video layer with the high-definition input video data. By determining the values of the compositing parameters in advance of the interactive editing process described above, expert human input may not be required for generating the finalized composite video data (e.g. a film). In the example of visual dubbing of a foreign language film, this may remove the necessity for the finalized video layer to be returned to a post-production house by a localization house, enabling the visual dubbing to be incorporated seamlessly into the filmmaking pipeline. Nevertheless, in other examples, human input may be used for the compositing/VFX/finishing processes for generating the finalized video layer.

The finalized video layer, along with compositing data, may be provided as a deliverable product to a distributor or end user, provided the distributor or end user has access to suitable software for performing the compositing process according to the compositing parameters. At least some of the compositing processes may be performed before delivering the finalized video data, though it is possible that compositing data for performing these processes may also be provided as part of the finalized video layer product (for example to enable further editing by the receiving party). In some examples, the finalized video layer may not be generated, and instead access to the object representation model and adjustable parameter values may be provided to a receiving party along with the compositing data. The same object representation model may then be used for example to generate multiple finalized video layers for a given object instance at the receiver side, each corresponding to a respective set of adjustable parameter values.

By generating composite video at a relatively low resolution during the interactive video editing process and applying a relatively simple compositing process, the interactive video editing may proceed efficiently, enabling the user to make many modifications and tweaks and receive visual feedback quickly without making excessive processing demands on the server. By contrast, the finalizing process, in which high-resolution video data is generated and processed, may take significantly longer and require significantly more processing resources. However, the finalizing process may only be performed once for a given video layer and is not intended as a means of providing rapid visual feedback. The finalizing process may be scheduled, and processing resources may be allocated appropriately, after a request for finalizing has been submitted. Nevertheless, in some examples, the same resolution of video data may be used in the finalizing process, e.g. with a different compositing process applied.

In some cases, an object to be modified may be partially occluded within certain image frames. Animated representations generated by the neural renderer will generally not include such occlusions, meaning that the generated video layers may include representations of objects which erroneously overlay other objects by which they should be occluded. In such cases, the process of generating a video layer may include generating an occlusion mask indicating pixels in which an object is occluded for each image frame in which the object is occluded. The occlusion mask may be determined for example using image segmentation or by comparing pixels of the input video data with pixels of the generated animated object representation and identifying regions in which significant deviations in pixel values are observed. The video layer may then include portions of the input video data indicated by the mask data, overlaid on the finalized animated representation of the object. In this way, occlusions of objects in the input video data may be maintained in the generated video layer. This approach may be used for generating the finalized video layer and/or for generating the intermediate video layers during iterations of the interactive editing. In examples where multiple objects are modified and accordingly multiple video layers are generated, the occlusion of one of the objects by another may differ as a result of either the rearmost of the foremost object being modified. In this case, the object modification and/or compositing may be performed in order from the rearmost to the foremost in a given sequence of image frames, to ensure that any synthetic background generated as part of a given video layer properly represents the modified object(s) in video layers behind the given video layer. For this purpose, the compositing data 206 may indicate (directly or indirectly) a depth-wise ordering of the objects in a given sequence of image frames. The depth-wise ordering may be determined, for example, based on observed occlusions of the objects, and/or based on depth information generated by object trackers, and/or using any suitable depth estimation method for example using a depth estimation network or stereoscopic analysis of pairs of image frames.

Figure 3:
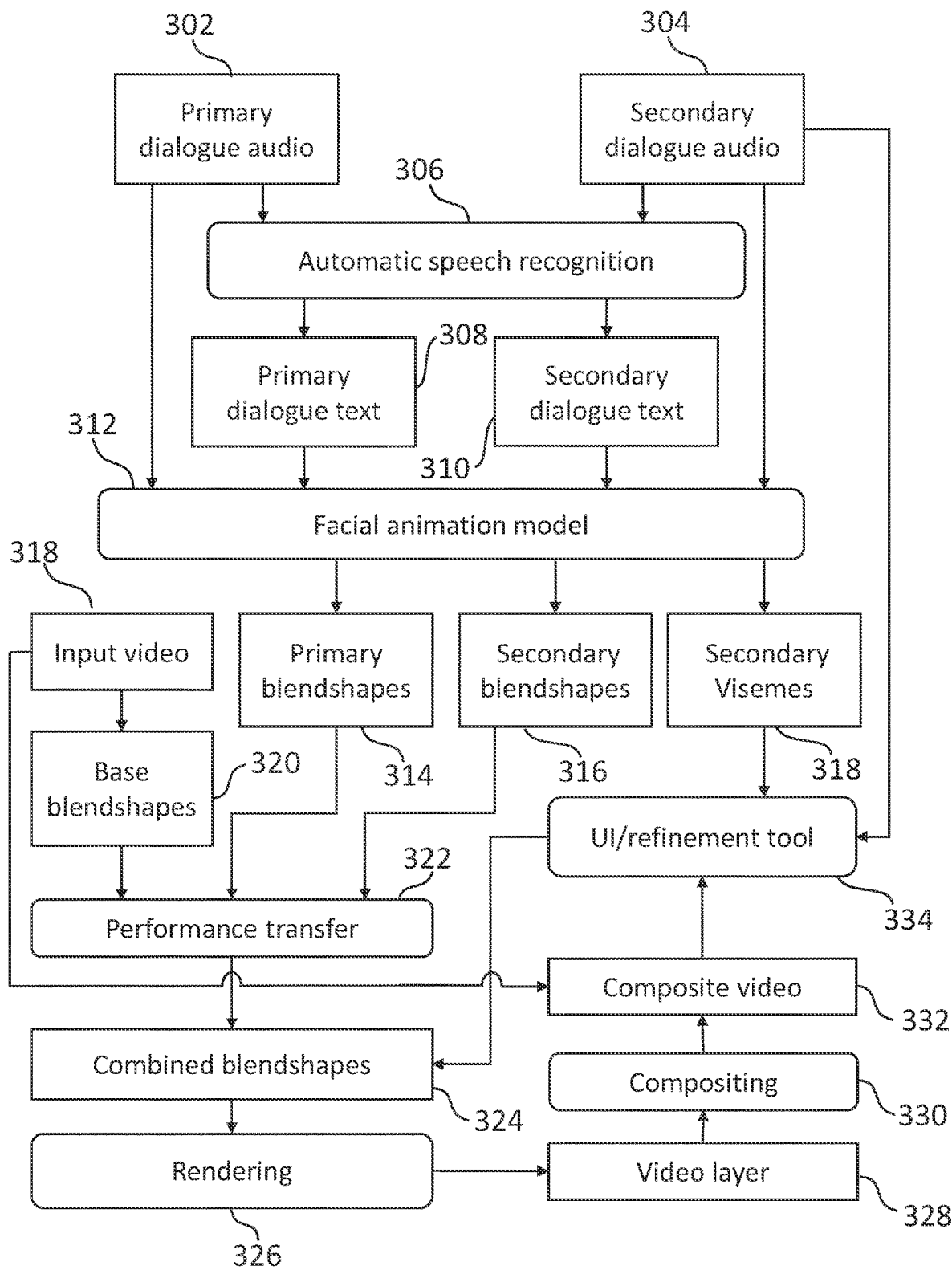
FIG. 3 shows schematically a method of determining values of a set of adjustable parameters for an object representation model in accordance with examples.

FIG. 3 shows an example of a method of determining values of a set of adjustable parameters for an object representation model based on audio data. The determined values may, for example, play the role of the adjustable parameter values 208 for the method 200 of FIG. 2. In this example, the aim of the process is to visually dub a performance of an actor within a scene of a film from primary dialogue (e.g. speech recorded by the actor for an original version of the film) to secondary dialogue (e.g. speech recorded, possibly by a different actor, for a secondary version of the film such as a foreign language version of the film or an otherwise edited version of the film). Accordingly, the adjustable parameters in this example include deformation parameters for a deformable model of a human face.

The method of FIG. 3 proceeds with obtaining primary language audio 302 and secondary dialogue audio 304. The primary language audio 302 and secondary dialogue audio 304 may include speech isolated from background sounds such as those appearing in a music and effects track, and may correspond for example to a single shot or scene of a film. In this example, the primary dialogue audio 302 and the secondary dialogue audio 304 are processed using automatic speech recognition (ASR) 306 (also known as computer speech recognition or speech to text) in order to determine primary dialogue text 308 and secondary dialogue text 310. Suitable audio speech recognition methods are well-known in the art and include, for example, hidden Markov models, dynamic time warping (DTW)-based speech recognition, and neural network approaches such as those based on recurrent neural networks or transformers. Whilst in the present example speech recognition is performed automatically, in other examples speech recognition may be performed and/or checked manually by a human user, or may be omitted altogether.

The primary dialogue audio 302 and (optionally) the primary dialogue text 308 are processed using a facial animation model 312. The facial animation model 312 is arranged to determine values of the adjustable parameters of the object representation model corresponding to the input audio and/or input text. The facial animation model 312 may for example process input audio and/or input text to determine a time-aligned viseme sequence. The facial animation model 312 may be rules-based facial animation or a machine learning-based facial animation model such as a neural-network-based facial animation model. For example, the facial animation model may be a trainable model provided with a language-dependent pronunciation dictionary. Suitable models for this purpose include the Montreal forced aligner, which is based on the freely-available Kaldi ASR toolkit. Other available tools for implementing the facial animation model include FAVE-align, Iclone®, and Wav2Lip. The facial animation model 312 may first generate a phoneme sequence based on the input audio and/or input text and then determine a corresponding viseme sequence from the generated phoneme sequence. The determined viseme sequence may then be converted to a sequence of adjustable parameter values such as blendshapes (e.g. delta blendshapes corresponding to mouth deformations) based on a viseme-blendshape mapping. The mapping(s) from visemes to values of the adjustable parameters may be generic or may be actor-specific. For example, a mapping may be implemented using a machine learning model trained on image/viseme pairs, or on video/audio pairs, and so on. In other examples, the facial animation model 312 may generate a sequence of blendshapes directly from the input audio and/or input text.

In the present instance, the primary dialogue audio 302 and/or the primary dialogue text 308 are processed using the facial animation model 312 to determine a sequence of primary blendshapes 314 encoding estimated facial deformations corresponding to the primary dialogue. Similarly, the secondary dialogue audio 304 and/or the secondary dialogue text 310 are processed using the facial animation model 312 to determine a sequence of secondary blendshapes 316 encoding estimated facial deformations corresponding to the primary dialogue, along with, in this example, a corresponding sequence of secondary visemes 318.

In addition to the primary blendshapes 314 corresponding to the primary dialogue and the secondary blendshapes 316 corresponding to the secondary dialogue, a sequence of base blendshapes 320 is determined, corresponding to the appearance of the actor's face in the input video 318, along with optionally values of other adjustable parameters for reproducing the appearance of the actor's face within the input video 318. In this example, the input video 318 includes footage of the actor performing the primary dialogue 302. The sequence of base blendshapes 320 may be determined, for example, by tracking the actor's face in the input video 318 using an object tracker, as discussed elsewhere in the present disclosure. Whereas the primary blendshapes 314 and the secondary blendshapes 316 may be delta blendshapes corresponding only to mouth movements relating to speech, the base blendshapes 320 may correspond to the entirety of the actor's face (i.e. all of the vertices of the deformable object model).

The method of FIG. 3 continues with performance transfer 322, in which the base blendshapes 320, the primary blendshapes 314, and the secondary blendshapes 316, are combined or otherwise processed to determine a sequence of combined blendshapes 324. For a given image frame of the input video 318, a combined blendshape may be a linear combination of a base blendshape, a primary blendshape, and a secondary blendshape. For example, the combined blendshape may include the base blendshape, minus the primary blendshape (optionally multiplied by a coefficient), plus the secondary blendshape (optionally multiplied by a coefficient). Subtracting the primary blendshape from the base blendshape may have the effect of removing or reducing the mouth deformation from the actor's original performance, whilst retaining other aspects of the actor's expression and performance. Adding the secondary blendshape may then have the effect of deforming the actor's mouth according to the secondary dialogue. The resulting sequence of combined blendshapes 324 may therefore represent the actor of the input video 318 exhibiting mouth movements corresponding to the sequence of visemes of the secondary dialogue, whilst retaining expressiveness and other aspects of the performance from the input video 318.

Although in the present example the performance transfer 322 involves determining a linear combination of blendshapes, in other examples alternative or additional processing may be performed. For example, a sequence of target blendshapes may be determined based on the base blendshapes 320, the primary blendshapes 314 and the secondary blendshapes 316, and automatic interpolation between the base blendshapes 320 and the target blendshapes may be performed, for example in dependence on the primary dialogue audio 302 and/or the secondary dialogue audio 304. In one example, breaks in speech may be identified from the audio track(s), for example using a machine learning model or audio filter, and interpolation may be performed so that the actor's mouth shape moves according to the base blendshapes 320 when the actor is not speaking, and according to the target blendshapes when the actor is speaking. Alternatively, or additionally, the combined blendshapes 324 may be determined from the base blendshapes 302 and the secondary blendshapes 316, and optionally the primary blendshapes 314, using a machine learning model trained using blendshapes derived from footage of the actor. The machine learning model may for example include a style-preserving performance transfer network trained to learn a mapping between the primary blendshapes and the secondary blendshapes (or an alternative representation of the primary and secondary speech).

Following the determination of the sequence of combined blendshapes 324, rendering 326 may be performed in which the combined blendshapes (and other adjustable parameter values) are provided to the object representation model, thereby to generate a video layer 328 comprising an animated representation of the actor's face, or a portion of the actor's face such as a jaw portion containing the mouth but excluding the eyes. Compositing 330 may then be performed in which the video layer 328 is composited with the input video 318 to generate composite video data 332, which may then be displayed via a user interface/refinement tool 334. Items 326-334 of FIG. 3 may correspond substantially to items 212-218 of FIG. 2. In the example of FIG. 3, the user interface 334 is provided with the sequence of secondary visemes 318, which may then be displayed to a user alongside the composite video data 332 to enable the user to modify the sequence of visemes, e.g. by modifying an amplitude and/or timing of one or more visemes as described above. The user interface 334 is also provided with the secondary dialogue audio 304, which may be played to the user alongside the composite video 332 for the purpose of synchronizing the animated representation of the actor with the UI. User input provided via the user interface 334 may result in a modification of the sequence of combined blendshapes 324, following which the animated representation of the actor's face may be re-rendered, re-composited, and provided back to the user interface 334 for further iterations.

Figure 4:
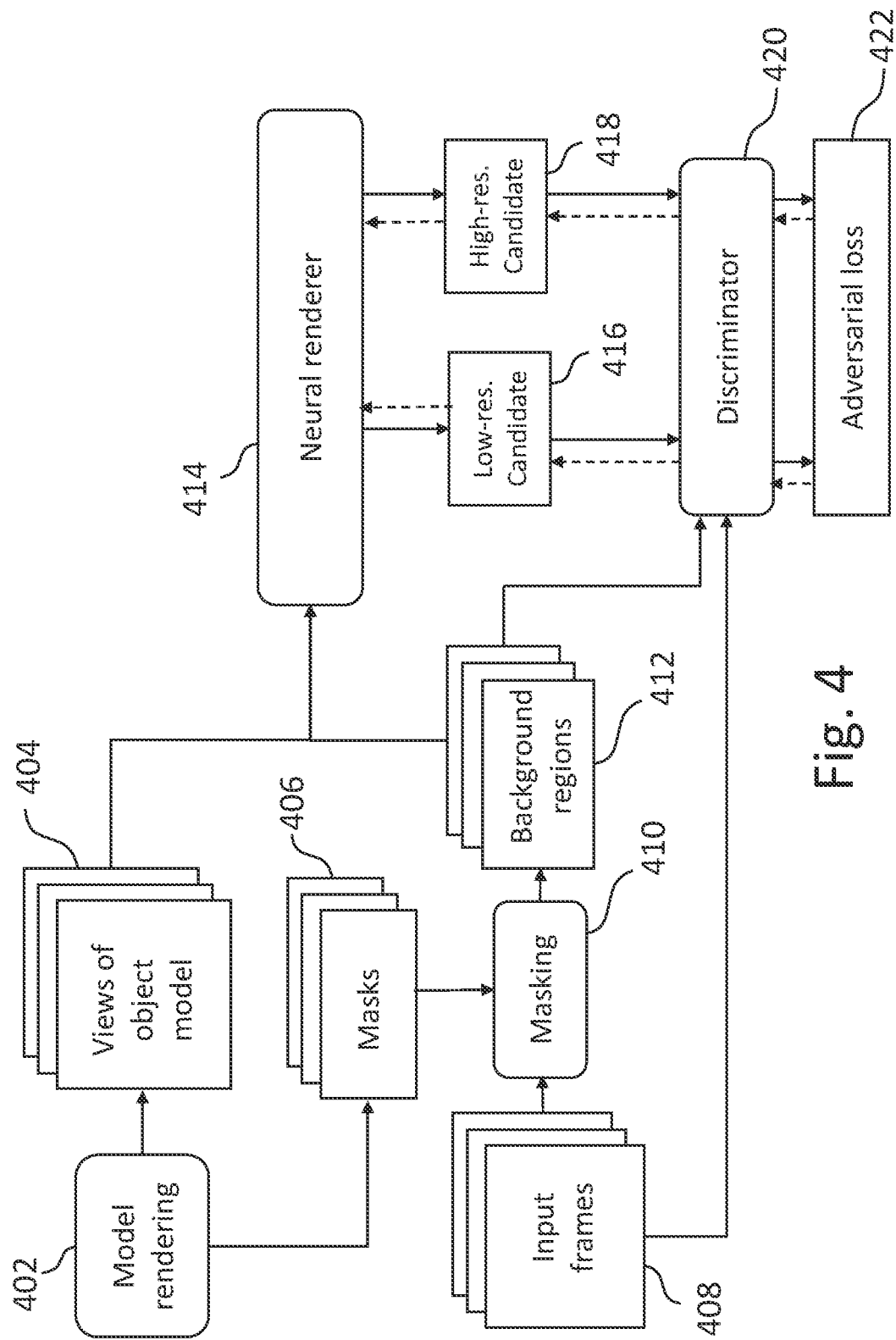
FIG. 4 shows schematically a method of training a neural renderer in accordance with examples.

FIG. 4 shows schematically a method of training a neural renderer 414 according to certain examples. The method includes model rendering 402 in which an object model (such as a deformable object model) is rendered using conventional rendering methods such as rasterization and/or ray tracing to generate a sequence of rendered views 404 of the object model. The sequence of views 404 may include the entire object or part of the object, for example part of the object which is to be replaced or modified.

In this example, the model rendering 402 further generates a sequence of masks 406 indicating which pixels of the rendered views 404 correspond to the object model (or part of the object model) and which pixels correspond to background. The sequence of masks 406 may be stored as a binary or continuous alpha channel designating a background region surrounding the object, and/or part of the object, as transparent. In order to generate the mask, an ST map may be obtained having linearly increasing values of U and V encoded in red and green channels respectively. The ST map may then be mapped to the object model using UV mapping. A suitable region for the mask may be defined on the ST map, either manually or automatically, for example by reference to predetermined feature vertices on the object model. A projection of the mapped region may then be rendered for each view 404 of the object model, and the rendered projection may then be used to define the geometry of the mask. This approach results in a mask which adheres to the geometry of the object model, and only needs to be defined once for a given object.

Alongside the rendered views 404 and the masks 406, a sequence of input image frames 408 is obtained. The input image frames 408 may for example be EXRs containing registered portions of a sequence of larger image frames taken from a scene of a film or other video data, where the EXRs may optionally be downsized from the original image frames, which may reduce the computational burden of the present training process. In the present example, values of a set of adjustable parameters of the object model have been determined by tracking an object within the input image frames 408, such that the rendered views 404 correspond to representations of the object as the object appears in the input image frames 408. The input image frames 408 optionally undergo color normalization and/or other processing, where the color normalization may assist the learning process described hereafter by reducing the extent of the space of images which the neural renderer must learn to generate.

The masks 406 may be used to perform masking 410, in which part of each of the input image frames 408 is designated as a background region 412. For a given image frame 408, the background region 412 may include a region not expected to change as a result of modifications of the object model. In other words, the masking 410 may segment part of the image frame potentially subject to modification from part of the image frame not subject to modification. According to the present method, the neural renderer may be trained to synthesize or reconstruct the potentially modifiable region. For a given image frame 408, the modifiable region may extend beyond the region defined by the generated mask 406 for that image frame. The neural renderer may therefore be trained to reconstruct at least part of the input image frame 408 surrounding the object model (or part of the object model), as opposed to just reconstructing the object model. The modifiable region may be defined, for example, by enlarging or otherwise expanding the mask 406 defining the boundary of the object model. How far the expanded mask should extend beyond the boundary of the object model may depend on the type of object and how much the boundary of the object model may change as a result of a deformation or change of pose.

An advantage of training the neural renderer to synthesize a region surrounding the object model is that in this way the neural renderer can learn to perform inpainting to synthesize regions which are revealed as a result of modifications to the geometry of the object model. In an example of visual dubbing, an image frame from an original version of a film showing an actor's mouth is wide open may need to be replaced with a modified image which shows the actor's mouth closed or partially closed. This modification may result in part of the neck and/or part of the background being revealed as the boundary of the object model has moved. The neural renderer trained using the present method may be capable of synthesizing a plausible part of the neck and/or part of the background. As will be explained in more detail hereinafter, the output of the neural renderer, including part of the background, can be blended with the original image frame, resulting in a more seamless output than would be achieved by a hard edge at the boundary of the object model.

Figure 5A:
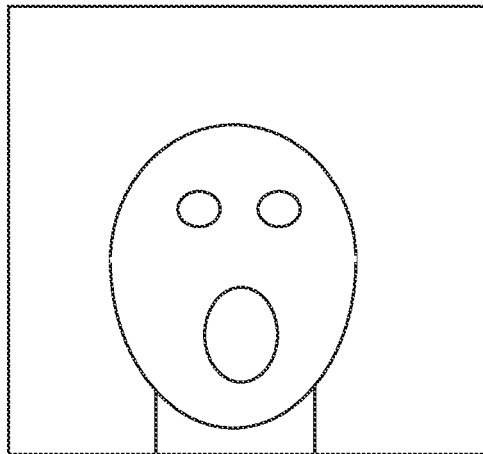
FIGS. 5A-5D show examples of image frames used to train a neural renderer.
Figure 5B:
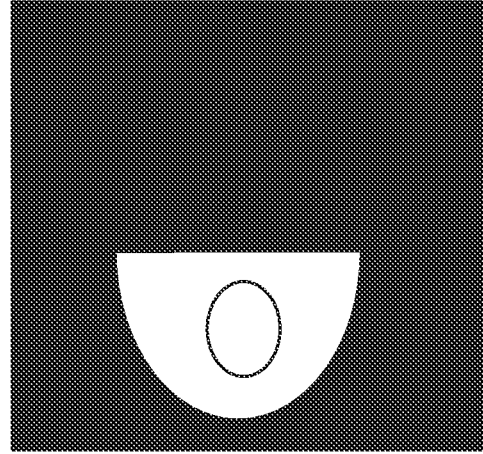
Figure 5C:
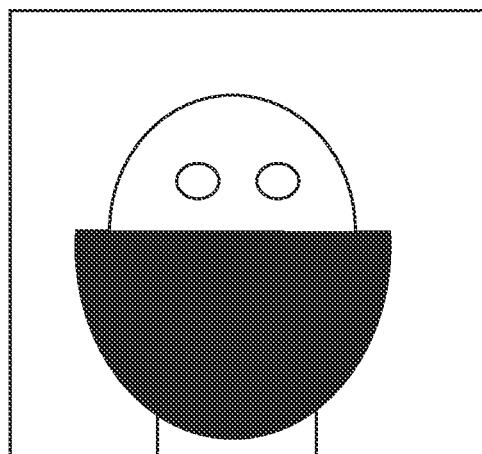
Figure 5D:
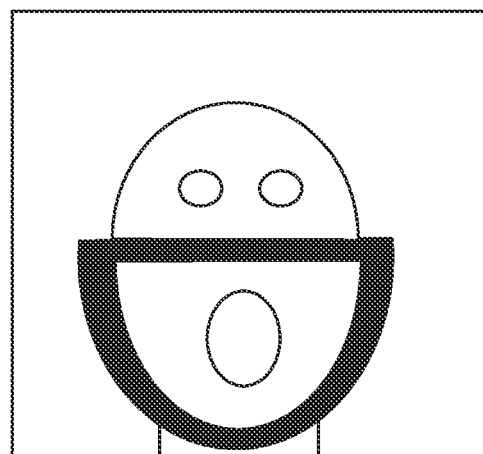

FIG. 5A shows an example of an image frame showing a human face. FIG. 5B shows a view of an object model corresponding to the image frame of FIG. 5A. In this example, the view of the object model includes a lower portion of the face, including the mouth but excluding the eyes. The region surrounding the view of the object model (shown in FIG. 5B in solid black) may be filled with a block color such as black, green, or white, or a predetermined pattern. FIG. 5C shows part of the image frame of FIG. 5A designated as background. Again, the region not designated as background (shown in FIG. 5C in solid black) may be filled with a block color such as black, green, or white, or a predetermined pattern. To determine the boundary of the background region containing the object model, a mask corresponding to the view FIG. 5B of the object model may be expanded such that a region surrounding the object model is not included in the designated background region. FIG. 5D shows a composite image in which the view of the object model is superimposed on the designated background region (e.g. using an alpha channel based on the unexpanded mask). It is observed that there is a region between the view of the object model and the designated background (shown in FIG. 5D in solid black) for which the composite image contains no information.

Returning to FIG. 4, the views 404 of the object model and the corresponding background regions 412 are provided as inputs to a neural renderer, for example as a concatenation of separate images (as shown in FIGS. 5B and 5C) or combined as a composite image (as shown in FIG. 5D). The neural renderer 414 is configured to process the views 404 and the background regions 412 to generate candidate reconstructions of the input frames. By providing the background region 412 in addition to the view 404 of the object model, the neural renderer 414 will attempt to extrapolate the background to "fill in" the region between the object model and the designated background, in order for the candidate reconstructions to match the corresponding input frame 408. The background region 412 further provides information on lighting and color characteristics of the input frames 408. Other inputs, such as attention masks and/or noise/grain maps (not shown) may optionally be provided as additional inputs to the neural renderer 414 and in certain settings may improve the quality of the output of the neural renderer 414.

In a single forward pass, the neural renderer 414 may be configured to process a space-time volume comprising a predetermined number of object model views 404 and corresponding background regions 412 (for example, 1, 2, 5, 10 or any other suitable number), to generate a low-resolution candidate reconstruction 416 and/or a high-frequency candidate reconstruction 418, each corresponding to a predetermined one or more of the input frames 408. A space-time volume in this context refers to a collection of images consecutively appearing within a temporal window. The neural renderer 414 may for example output a candidate reconstruction of a single frame corresponding to the last input image frame 408 of the space-time volume. By simultaneously processing inputs corresponding to multiple image frames, the neural renderer 414 may learn to use information on how the object moves over time in order to achieve a more realistic output. By performing this processing in a temporally sliding window fashion, the neural renderer 414 may generate a candidate reconstruction of the object for each input image frame 408. For the first or last few input image frames 408, the space-time volume may not be defined, and such frames may be discarded for the purpose of training the neural renderer 414. Alternatively, the space-time volume may be extended by replicating the first and/or last frame X times, where X is the size of the temporal window, effectively imposing a Dirichlet boundary condition. In this way, the space-time volume remains defined, but may be biased at the first and last few input image frames 408. Other boundary conditions may be alternatively be used to extend the space-time volume.

Figure 6:
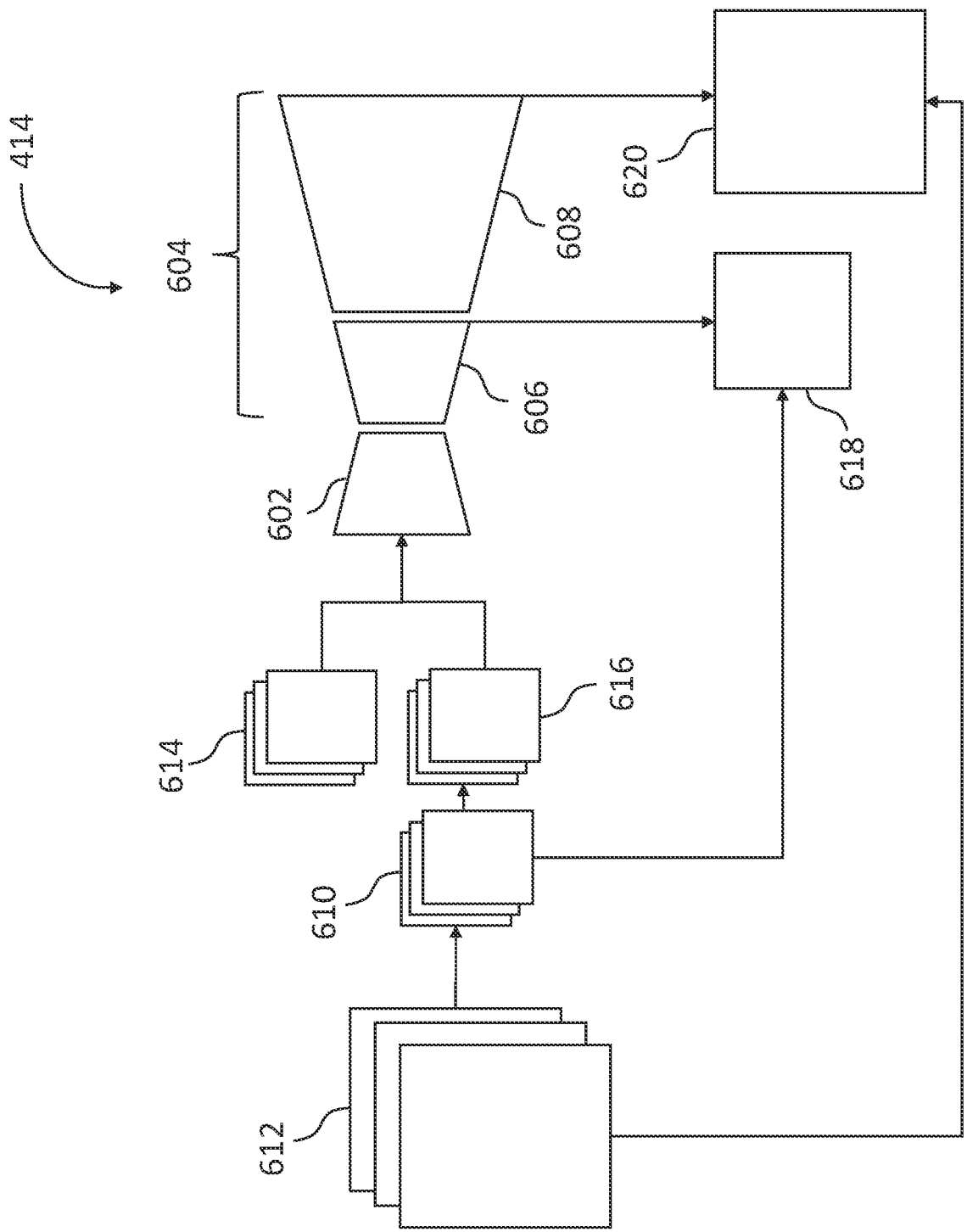
FIG. 6 shows schematically a deep neural network architecture in accordance with examples.

In an example implementation, as shown in FIG. 6, the neural renderer 414 may have an encoder-decoder architecture comprising an encoder 602 and a two-stage decoder 604 comprising a first decoder stage 606 and a second decoder stage 608. The encoder 602 in this example is configured to map a space-time volume to a latent variable in a low-dimensional latent space, and includes several downsampling components or layers which may each reduce the resolution of their input. A given downsampling component may include, for example, a convolutional filter and a nonlinear activation function (such as the rectified linear unit, ReLU, activation function). In this example, the space-time volume includes, for a sequence of input image frames 610 within a given temporal window (in this example obtained by downsampling a sequence of higher-resolution image frames 612), a corresponding sequence of views 614 of an object model and sequence of background regions 616 (optionally combined as a composite image as described above with reference to FIG. 5D).

The first decoder stage 606 of the decoder 604 in this example is configured to map the latent variable to a low-resolution image frame 618 (or a sequence of several low-resolution image frames). The first decoder stage 606 may include several upsampling components or layers, some of which may increase the resolution of their input, followed by an output component configured to output an image frame (with appropriately normalized color ranges). The second decoder stage 608 of the decoder 604 may be configured to receive data from one of the components of the first decoder stage 606 (e.g. the output component or one of the downsampling components preceding the output component), to generate a high-resolution image frame 620 (or a sequence of several high-resolution image frames). The second decoder stage 608 may include several upsampling components or layers, some of which may increase the resolution of their input, followed by an output component configured to output one or more high-resolution image frames. Within the decoder portion 604, a given upsampling component may include a deconvolutional filter and a non-linear activation function, along with optionally other layers or filters. At least some components of the encoder and/or decoder portions may utilize batch normalization and/or dropout, and/or other techniques known in the art to ensure effective and efficient training.

In a specific example, the encoder 602 includes 8 downsampling components to reduce the resolution from 256× 256 to 32×32, the first decoder stage 606 includes 8 upsampling components to return the resolution to 256×256, and the second decoder stage 608 includes 8 further upsampling components to increase the resolution to 1,024×1,024. Each downsampling component employs a 4×4 convolutional layer at stride 2 followed by batch normalization, dropout, and a leaky ReLU activation function. An example upsampling component utilizes a cascaded refinement strategy and employs a 4×4 deconvolutional filter at stride 2, followed by batch normalization, dropout and a ReLU activation function, followed by two 3×3 convolutional filters at stride 1 each followed by a further ReLU activation function. The output of the final upsampling component of each of the decoder stages 606, 608 may be passed through a Tan H activation function to generate a single image frame with each color channel normalized to the range [−1,1]. Batch normalization may be omitted from the first downsampling component and the last upsampling component, and as a refinement the architecture may employ skip connections from the input layer to one or more of the upsampling components to enable the network to transfer fine-scale structure.

During training, the generated low-resolution image frame 618 may be compared with one of the downsampled input image frames 610 (for example, a last image frame of the sequence of input image frames 610), and the generated high-resolution image frame 620 may be compared with one of the original input image frames 612 (for example, a last image frame of the sequence of input image frames 612). It will be appreciated that other architectures are possible for the neural renderer 414, and the present architecture is provided by means of example only. For example, the neural renderer 414, or any portion of the neural renderer 414, may be implemented using a diffusion model, a transformer, and/or any other generative model(s) for image-to-image mappings. While in FIG. 6 the neural renderer 414 has two outputs at two different resolutions, in other examples a neural renderer may have more outputs than two, enabling the neural renderer to output multiple resolutions for example corresponding to different sizes of object appearing in a film.

The neural renderer 414 is adversarially trained to reconstruct the input image frames 408. In this example, a discriminator 420 is employed, which may include one or more discriminator networks. The discriminator 420 in this example takes as input the low-resolution candidate reconstruction 416 and/or the high-frequency reconstruction 418, or a corresponding one or more of the input image frames 408 (which may be considered "ground truth" in this context). The discriminator 420 attempts to predict whether it has received the candidate reconstruction(s), or the ground truth input image frame(s) 408. The discriminator 420 may take further inputs, for example the same space-time volume input to the neural renderer 414, which may simplify the task of the discriminator 420, thereby improving the efficiency of training the neural renderer 414. One or more adversarial losses 422 are determined which reward the discriminator 420 for making correct predictions and rewards the neural renderer 414 for causing the discriminator 420 to make incorrect predictions. The discriminator 420 may make a single prediction of whether its inputs include the candidate reconstructions 416 and 418, in which case a single adversarial loss 422 may be determined, though other configurations are possible for example in which separate adversarial losses are generated for predictions of the low- and high-resolution inputs to the discriminator 420.

Backpropagation (represented in FIG. 4 by dashed arrows) may be used to determine a gradient of the adversarial loss 422 with respect to parameters of the neural renderer 414 and the discriminator 420, and the parameter values of the neural renderer 414 and the discriminator 420 are updated in dependence on the determined gradient of the adversarial loss 422, for example using gradient descent or a variant thereof. The adversarial loss 422 may be supplemented with one or more further losses (not shown), such as a photometric loss which penalizes differences between pixel values of an image frame 408 and pixel values of a candidate reconstruction 416, 418 output by the neural renderer 414, or a perceptual loss which penalizes differences between features of an image frame 408 and features of a candidate reconstruction 416, 418. The photometric loss may for example be an L1 loss, an L2 loss, or any other suitable loss based on a comparison between pixel values of the image frame 408 and pixel values of the candidate reconstruction 416, 418. In a particular example, the photometric loss may be a modified L2 loss which is modified to reduce a contribution of small photometric differences. Separate photometric and/or perceptual losses may be determined between the low-resolution candidate reconstruction 416 and the downsampled input image frames 408, and between the high-resolution candidate reconstruction 418 and the input image frame prior to downsampling.

By combining an adversarial loss function with a photometric and/or perceptual loss function, the neural renderer 414 can learn to generate reconstructions which are both photometrically alike to the input image frames and stylistically/visually indistinguishable from the input image frames. It is to be noted that the loss function(s) may be defined for an entire input image frame 408, resulting in the neural renderer 414 learning to reconstruct the entire image frame 408, or may be defined for a subregion of the image frame 408. In some examples, the neural renderer 414 may be configured to output an additional channel or channels (such as a continuous alpha channel) for use in blending the neural rendering output with a corresponding ground truth input image frame 408 to generate the candidate reconstruction 416, 418. The candidate reconstructions 416 and/or 418 may then include a blended output comprising an output of the neural renderer 414 blended with the ground truth image frame in accordance with the additional channel or channels. In this case, the losses determined by the discriminator 420 will backpropagate though the additional channel as well as the neural rendering output, resulting in the neural renderer 414 learning how to optimally blend the ground truth and synthesized images to fool the discriminator 420.

For certain configurations of the neural renderer 414 (for example where a set of layers used to generate the low-resolution output is a subset of a set of layers used to generate the high-resolution output), the training of the low- and high-resolutions outputs may be performed jointly, with separate losses directed towards generating accurate reconstructions at different depths of the neural renderer 414. To reduce the time and computational resources required for training, the training of the neural renderer may optionally be performed in two phases. In an initial training phase, the high-resolution portion of the neural renderer 414 may be omitted and the low resolution output may be generated using only low-resolution inputs and outputs. When certain criteria are satisfied, for example performance or convergence criteria, or when a predetermined number of training iterations have taken place, the high-resolution portion of the neural renderer may be introduced, and loss functions associated with the high-resolution output may be switched on. During the second training phase, the neural renderer 414 is already partially trained (insofar as the low-resolution output is trained) and training of the high-resolution outputs, which use at least some of the same network layers, may be achieved in fewer training iterations. More generally, the neural renderer 414 may include one or more successive neural networks or neural network components with progressively higher resolution outputs, which may be referred to as super-resolution networks or upsampling networks. These network components may be trained successively by starting with the network component having the lowest resolution output and then sequentially adding network components with successively higher resolution outputs during the training process. In other examples, one or more successive super-resolution networks or upsampling networks may be trained independently from the low-resolution portion of the neural renderer 414. The super-resolution network(s) may for example be trained using pairs of corresponding low- and high-resolution images. High levels of accuracy of the super-resolution network(s) may be attained by training on image pairs of the object intended to be modified, for example images of the object isolated from image frames of a film.

Figure 7:
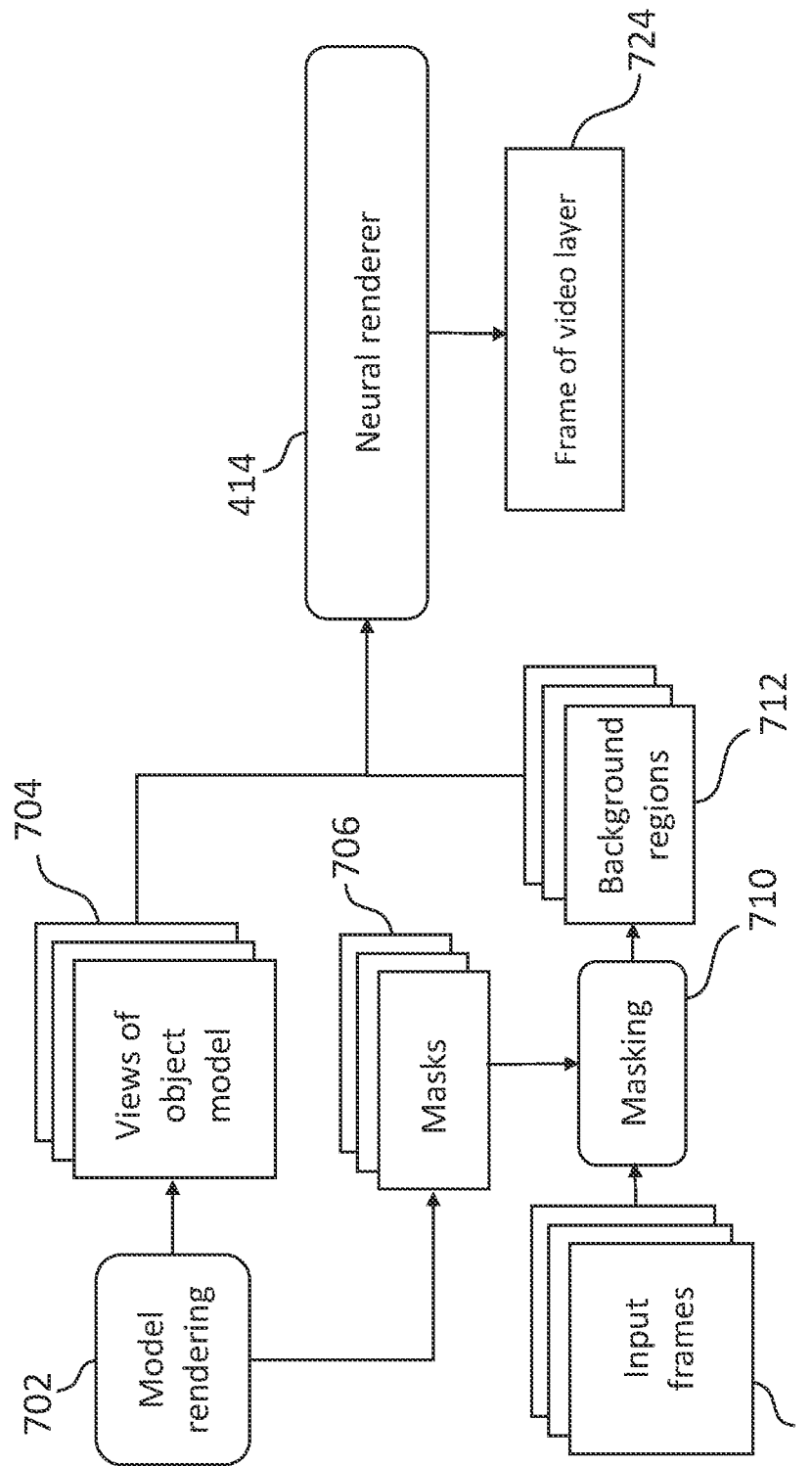
FIG. 7 shows schematically a method of modifying an object within a sequence of image frames.

The neural renderer 414 using the methods above may subsequently be used to generate photorealistic animated object representations. FIG. 7 shows an example of a method of generating a video layer comprising an animated object representation using the trained neural renderer 414 of FIG. 4. The method may substantially correspond to the method of FIG. 4, but without the discriminator network 422 and associated functionality for training the neural renderer 414. Reference signs for substantially corresponding features between FIG. 4 and FIG. 7 are the same (modulo 100). The model rendering 704 of FIG. 7 may be based on adjustable parameter values determined as discussed above with reference to FIG. 2 or FIG. 3. The output of the neural renderer 414 in this example is a frame 724 of a video layer comprising an animated object representation. The animated object representation may be a low-resolution object representation or a high-resolution object representation, for example depending on whether the neural renderer 414 is being used within an interactive object editing process or to generate a finalized video layer. Accordingly, the frame 724 may be output by a low-resolution output or a high-resolution output of the neural renderer 414. The object representation may include a separate channel, such as a continuous alpha channel, for compositing the object representation with a corresponding frame of image data, as discussed above with reference to FIG. 4. The video layer (including, optionally, the separate alpha channel) may be provided alongside compositing data for compositing the video layer with input video data.

In some examples, for example when the method of FIG. 7 is used to generate a finalized video layer, the output of the neural renderer 414 may be further processed by one or more additional neural networks or neural network modules (not shown) to generate the frame 724. These neural network modules may be arranged sequentially to cumulatively modify the output of the neural renderer 414 for the purpose of compositing the video layer with the input video data. Any of these neural network modules may be implemented as diffusion networks, transformer networks, encoder-decoder networks, or using any other suitable network architecture. Some of the neural network modules may take additional inputs. For example, a neural network for simulating camera focus may use depth information such as depth maps and/or camera intrinsic parameters. A neural network for simulating motion blur may take as input a frame rate, shutter angle, motion vectors and/or optical flow. The neural network modules used to apply compositing effects may be trained independently from the neural renderer 414 using known training methods, for example adversarially training a given network module to map between pairs of corresponding images including a first image in which a given effect is absent and a second image in which the effect is present (the effect may for example be added synthetically to generate the second image using known VFX techniques).

Figure 8:
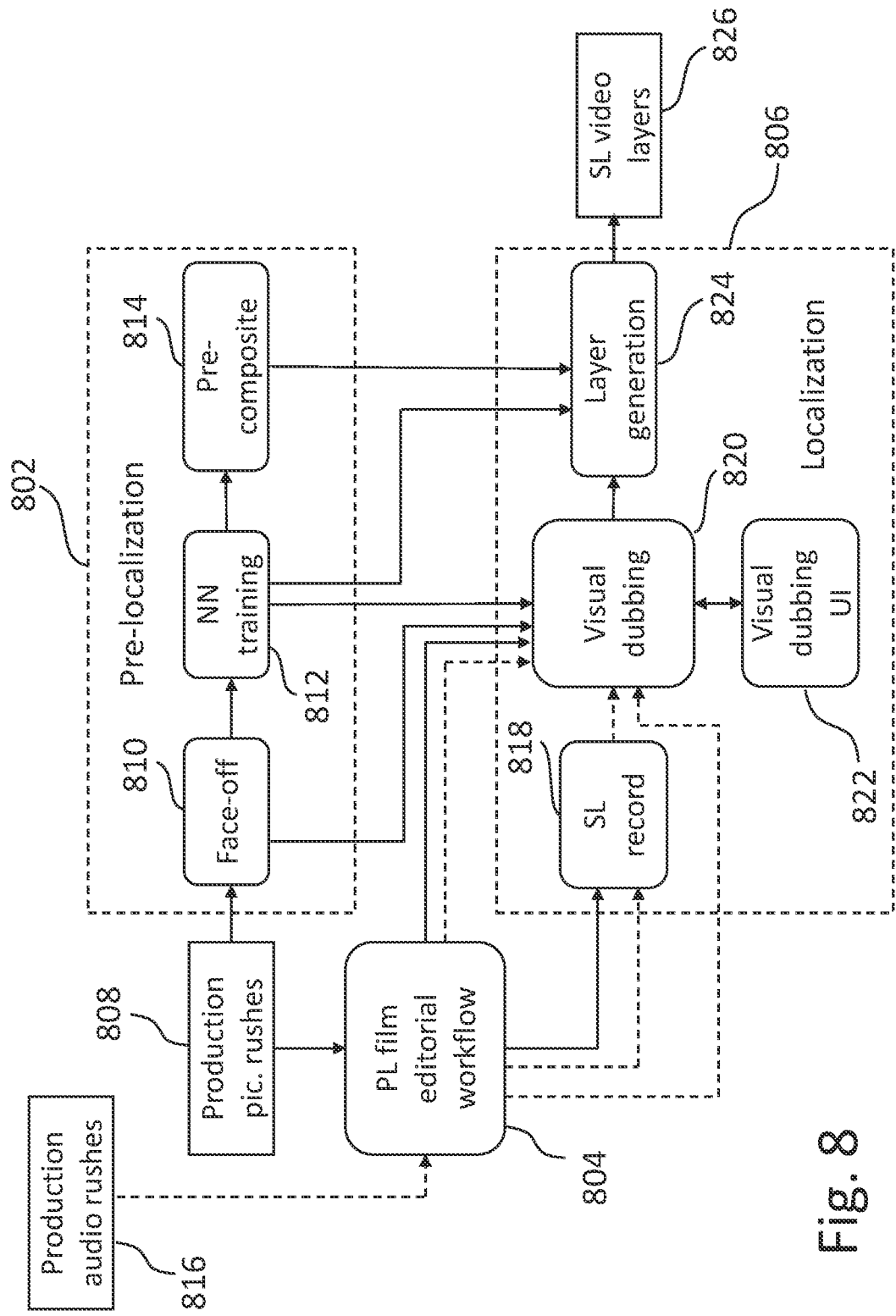
FIG. 8 shows schematically a filmmaking pipeline for a foreign language version of a film including visual dubbing, in accordance with examples.

FIG. 8 shows a filmmaking pipeline for a foreign language version of a film in which visual dubbing is performed in accordance with the certain methods described herein. The solid arrows in FIG. 8 represent paths of video data whereas the dashed arrows represent paths of audio data. Processes shown within the dashed box 802 labelled "pre-localization" may be performed alongside a primary language film editorial workflow 804 and may be overseen by a commercial entity responsible for the technical implementation and infrastructure for performing visual dubbing. By contrast, processes shown within the dashed box 806 labelled "localization" may be performed after the primary language film editorial workflow 804 and may involve input from commercial entities involved in producing secondary language versions of the film (such as localization houses). In some examples, software and infrastructure used to perform the localization processes in the dashed box 802 may be provided via a software-as-a-service model and may be hosted and maintained by the same commercial entity responsible for the pre-localization processes in the dashed box 806.

In this example, production picture rushes 808 (optionally transcoded and/or downsized) undergo a face-off process 810 in which instances of actors' faces are detected and isolated using a face tracker. The resulting instances of the actors' faces are then used for neural network training 812. A separate neural renderer may be trained for each speaking actor in each scene (owing to the fact that different scenes are likely to have different visual characteristics), or alternatively the same neural renderer may be used across multiple scenes (or even across multiple films and/or with multiple actors). Following the neural network training 812, a pre-compositing process 814 may take place in which compositing data is determined for use in generating finalized video layers, e.g. using one or more test scripts.

Whilst the neural network training 812 and pre-compositing 814 takes place, the production picture rushes 808 and associated production audio rushes 816 may be used in the primary language (PL) editorial workflow 804, which includes an offline edit in which footage from the production picture rushes 808 is selected for the final film. The resulting offline edit (picture and audio) are used to guide secondary language (SL) recording 818, which may involve multiple secondary language actors recording SL dialogue for multiple PL actors. In this example, the SL recording 818 includes audio recording only, though in other examples SL recording may further include video recording. The offline edit may further be used to determine which instances of the PL actors' faces need to be translated.

The audio data resulting from the SL recording 818 may be used as driving data for visual dubbing 820, in which the neural renderer(s) trained at 812 are used to generate animated representations of the PL actors' faces where necessary for incorporation into the film based on values of a set of adjustable parameter values for an object model. The values of the set of adjustable parameter values may be modified or tweaked based on user input via a visual dubbing user interface 822, as discussed elsewhere in the present disclosure. Following the visual dubbing 820, layer generation 824 may be performed in which high-resolution animated representations of the actors' faces are generated using the trained neural renderers and values of the set of adjustable parameter values determined during visual dubbing 820. The layer generation 824 may further use data generated during pre-compositing 814 to enable the SL video layers 826 to visually match corresponding portions of image frames of the final PL film. The layer generation 824 may include compositing the animated representations of the actors' faces with portions of image frames of the final PL film, such that the SL video layers 826 include composite video data. The SL video layers 826 may for example include framewise boxes comprising composite video data to be overlaid on frames of the final PL film to generate the final SL film. Alternatively, the compositing process may be omitted, and the SL video layers 826 may be provided along with a channel for blending the SL video layers 826 with the final PL film, to generate a final SL film.

The SL video layers 826 may be provided to a delivery house alongside the final PL film, the audio recorded during SL recording, and metadata indicating at which points in the film the SL video layers 826 are to be inserted into the PL film. In this way, the SL film (along with possibly several other SL versions of the film) may be constructed from the PL film and the SL video layers 826, for example at the delivery house or at an end user device (provided with appropriate software) streaming the SL film from the delivery house. This delivery method may significantly reduce the amount of data being transferred between parties compared with sending full SL films (each of which may be a file of several hundred Gigabytes). Many different versions of a film may be generated by providing different video layers. Nevertheless, in other examples the SL film may be constructed in full during the localization phase, and/or the SL video layers 826 may be transferred to human experts to perform VFX and other processes.

Figure 9:
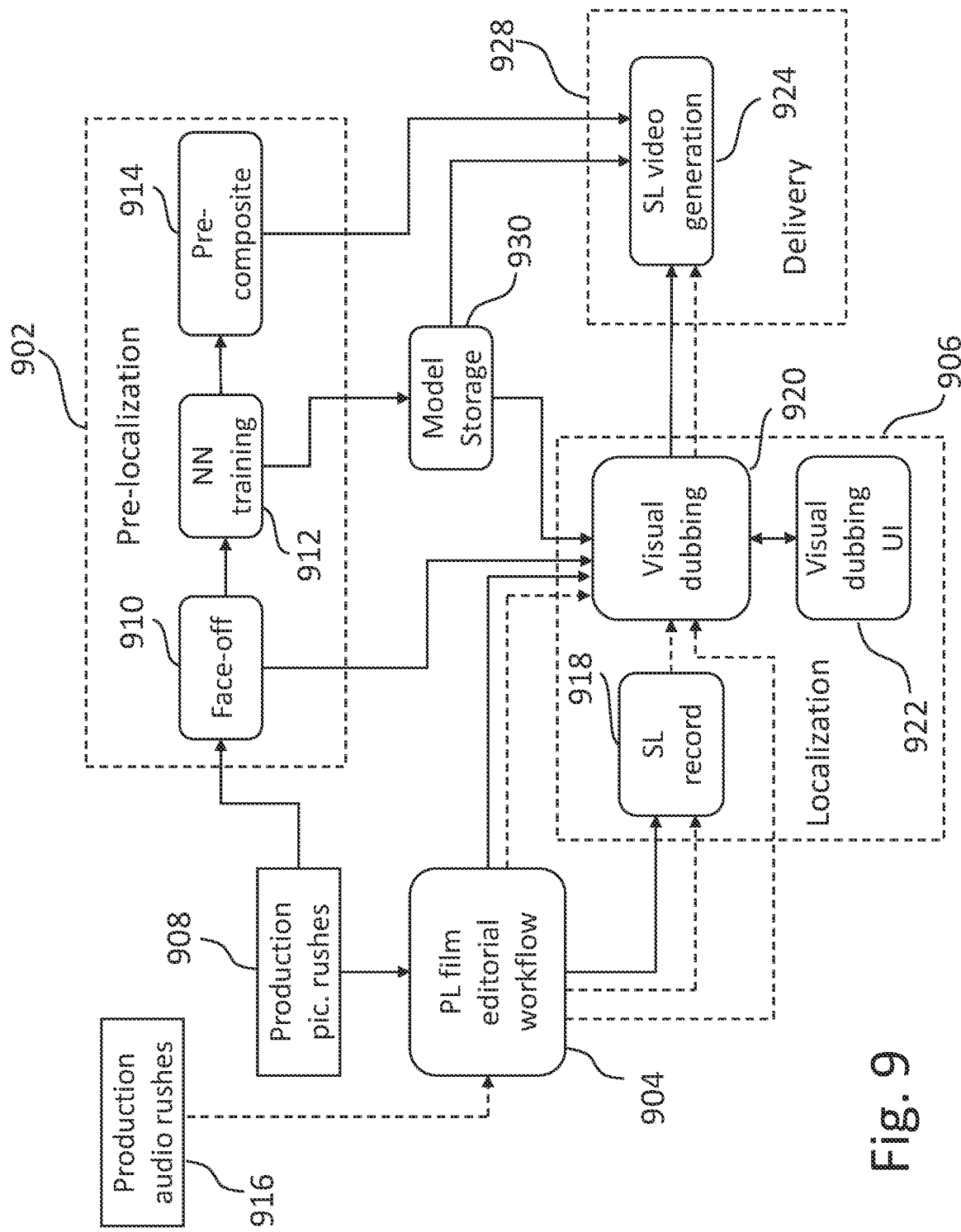
FIG. 9 shows schematically a filmmaking and distribution pipeline for a foreign language version of a film including visual dubbing, in accordance with examples.

FIG. 9 shows a further example of a filmmaking pipeline for foreign language version of a film in which visual dubbing is performed in accordance with the certain methods described herein. The solid arrows in FIG. 9 represent paths of video data whereas the dashed arrows represent paths of audio data. Reference signs for substantially corresponding features between FIG. 8 and FIG. 9 are the same (modulo 100). In FIG. 9, the process of SL video generation 924, which may include generating and composing video layers comprising animated representations of faces speaking with SL dialogue, is shown within a dashed box 928 labelled "delivery", indicating that this process may be performed at a delivery house, which may be a separate commercial entity to those involved in the pre-localization and/or the localization. In this example, model storage 930 is performed whereby neural renderers trained using during neural network training 912 are stored in a model database, potentially alongside many other trained neural renderers. The neural renderers may be stored with metadata indicating, for example, the name of an actor for which the neural renderer is trained to generate animated representations, along with optionally information on film(s), scene(s), etc. on which the neural renderer has been trained. Neural network modules for performing operations such as upscaling or compositing modifications as described herein may also be stored in the model database, either in association with specific trained neural renderers or independently of the trained neural renderers. The model database may additionally store deformable object models or other components of object representation models. In this example, the model database is maintained by the service provider involved in the pre-localization stage of the pipeline, and is accessible by the parties involved in localization and delivery. In particular, the localization house may access neural renderers during the process of visual dubbing 920. In other examples, the model database may be maintained and hosted by the localization house or the delivery house.

In the example of FIG. 9, the localization house may not generate finalized video layers. Instead, the delivery house may receive values of adjustable parameters for one or more object models directly or indirectly from the localization house, along with compositing data. The delivery house may then generate an SL film using appropriate object representation models to generate visually dubbed animated representations of the object. Generating the SL film may for example involve generating video layers based on the received values of the adjustable parameters, and composing the generated video layers according to the compositing data. This approach may enable the delivery house to generate multiple versions of a film, for example in different languages and/or in different video formats, for example in response to a user request or a request received from a remote system, whilst reducing the need to transmit high volumes of video data between the localization house(s) and the delivery house.

It is stressed that whilst the examples of FIGS. 8 and 9 refer to generation of a secondary language version of a film, the workflows and methods described herein are not limited to such use cases. In one example, the methods described herein are used to remove the need for a reshoot of one or more scenes of a film. In other examples, the methods described herein may be used for deep editing of other objects in film (such as whole humans, animals, vehicles, etc.), with video layers being generated for each edited object. More generally, this approach may be used to generate output video data based on data received from a remote system including object data and compositing data. The object data may indicate, for each of a set of objects, values of a set of adjustable parameters for a respective object representation model. The compositing data may indicate at least trajectories of the set of objects relative to a reference frame. In some examples, video data depicting an entire scene may be composed in this way, with different layers being generated for objects in the scene and then composed in accordance with the compositing data. In other examples, background video data may additionally be received, and the generated video layers may be composed with the background video data to generate the output video data. In some examples, the compositing data may include scene-level lighting and/or camera information for use in generating effects such as defocus and/or shadows. In further examples still, output video data may be generated in near-real-time at a receiver device, based on object data and compositing data received from a remote system. This may be performed for example in near-real-time, provided the receiver device has access to the required object representation models.

At least some aspects of the examples described herein with reference to FIGS. 1-8 comprise computer processes performed in one or more processing systems and/or processors. However, in some examples, the disclosure also extends to computer programs, particularly computer programs on or in an apparatus, adapted for putting the disclosure into practice. The program may be in the form of non-transitory source code, object code, a code intermediate source and object code such as in partially compiled form, or in any other non-transitory form suitable for use in the implementation of processes according to the disclosure. The apparatus may be any entity or device capable of carrying the program. For example, the apparatus may comprise a storage medium, such as a solid-state drive (SSD) or other semiconductor-based RAM; a ROM, for example, a CD ROM or a semiconductor ROM; a magnetic recording medium, for example, a floppy disk or hard disk; optical memory devices in general; etc.

The above embodiments are to be understood as illustrative examples. Further embodiments are envisaged. For example, the interactive user interface aspects of the disclosure may be omitted, such that video layers may be generated in a completely automated manner, for example based on audio (e.g. secondary language audio) or other driving data such as video. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A system comprising at least one processor and at least one memory storing instructions which, when executed by the at least one processor, cause the at least one processor to carry out operations comprising:
   receiving, from a remote system:
      object data comprising, for each object of a plurality of objects, values of a set of adjustable parameters of a respective object representation model; and
      compositing data indicating at least, for each object of the plurality of objects, a respective trajectory of the object relative to a reference frame; and
   processing the object data and the compositing data, using the respective object representation models, to generate output video data depicting a scene comprising, for each object of the plurality of objects, an animated representation of the object following the respective trajectory relative to the reference frame,
   wherein for each object of the plurality of objects, the respective object representation model comprises a respective neural network and is arranged to generate, using the respective neural network, animated representations of the object in which a geometry the object is controllable by the set of adjustable parameters,
   wherein generating the output video data comprises:
      for each object of the plurality of objects, using the respective object representation model and the values of the set of adjustable parameters for the respective object representation model to generate a respective video layer depicting the animated representation of the object; and composing the generated video layers in accordance with the compositing data to generate the output video data,
wherein for a first object of the plurality of objects, the respective neural network is arranged to:
receive input video data depicting a region of the scene; and
generate the respective video layer to comprising a reproduction and/or extension of the region of the scene around the animated representation of the first object.

2. The system of claim 1, wherein:
the operations further comprise obtaining background video data depicting at least part of the scene; and
composing the generated video layers comprises overlaying the generated video layers on the background video data.

3. The system of claim 1, wherein:
the scene comprises a depiction of the first object; and
the region of the scene includes a region in a vicinity of the depiction of the first object in the scene.

4. The system of claim 1, wherein for the first object, the respective neural network is arranged to generate a continuous alpha channel for blending the reproduction and/or extension of the region of the scene with the input video data.

5. The system of claim 2, wherein:
the input video data comprises a depiction of a first object of the plurality of objects;
the operations comprise obtaining mask data indicating an occlusion of the depiction of the first object in the input video data; and
generating the respective video layer for the first object comprises overlaying a portion of the input video data indicated by the mask data on the animated representation of the first object.

6. The system of claim 1, wherein:
the compositing data indicates a depth-wise order of the plurality of objects; and
generating the respective video layers is performed sequentially from a rearmost object of the plurality of objects to a foremost object of the plurality of objects.

7. The system of claim 1, wherein for a first object of the plurality of objects, generating the respective video layer comprises modifying a visual appearance of the respective animated representation of the first object in accordance with the compositing data.

8. The system of claim 7, wherein modifying the visual appearance of the respective animated representation of the first object comprises processing the respective animated representation of the first object using one or more neural network modules trained to perform at least one of upscaling, color grading, simulating motion blur, simulating camera focus, denoising, and regraining.

9. The system of claim 1, wherein:
the compositing data comprises at least one of:
lighting information indicating at least one characteristic of lighting for the scene; and
camera information indicating one or more parameters of a camera; and
generating the output video data comprises providing, to the respective object representation model for each of the plurality of objects, said at least one of the lighting information and camera information.

10. The system of claim 1, wherein for a first object of the plurality of objects, the respective object representation model comprises a three-dimensional model controllable by the set of adjustable parameters, wherein the respective neural network is trained to generate animated representations of the first object based at least in part on a view of the three-dimensional model.

11. The system of claim 1, wherein:
the object data comprises, for each object of the plurality of objects, a respective indicator for the respective object representation model in a database of object representation models; and
the operations include, for each object of the plurality of objects, accessing the respective object representation model in the database using the respective indicator.

12. The system of claim 1, wherein:
the object data is first object data comprising first values of the set of adjustable parameters of the respective object representation model for each object of the plurality of objects;
the output video data is first output video data; and
the operations comprise:
obtaining second object data comprising, for each object of the plurality of objects, second values of the set of adjustable parameters of the respective object representation model; and
processing the second object data and the compositing data, using the respective object representation model for each of the plurality of objects, to generate second output video data depicting a modified version of the scene.

13. The system of claim 1, wherein a first object of the plurality of objects is a human face.

14. The system of claim 1, wherein:
the operations comprise receiving a request for the output video data, the request indicating a video format for the output video data; and
generating the output video data comprises generating the output video data to have the indicated video format.

15. The system of claim 1, wherein the operations further comprise transmitting the output video data to a device configured to display the output video data.

16. The system of claim 1, further comprising a display, wherein the operations comprise displaying the output video data via the display.

17. A computer-implemented method comprising:
receiving, from a remote system:
object data comprising, for each object of a plurality of objects, values of a set of adjustable parameters of a respective object representation model; and
compositing data indicating at least, for each object of the plurality of objects, a respective trajectory of the object relative to a reference frame; and
processing the object data and the compositing data, using the respective object representation models, to generate output video data depicting a scene comprising, for each object of the plurality of objects, an animated representation of the object following the respective trajectory relative to the reference frame,
wherein for each object of the plurality of objects, the respective object representation model comprises a respective neural network and is arranged to generate, using the respective neural network, animated representations of the object in which a geometry the object is controllable by the set of adjustable parameters,
wherein generating the output video data comprises:
for each object of the plurality of objects, using the respective object representation model and the values of the set of adjustable parameters for the respective object representation model to generate a respective video layer depicting the animated representation of the object; and composing the generated video layers in accordance with the compositing data to generate the output video data, wherein for a first object of the plurality of objects, the respective neural network is arranged to:

receive input video data depicting a region of the scene; and generate the respective video layer to comprising a reproduction and/or extension of the region of the scene around the animated representation of the first object.

18. One or more non transitory storage media comprising instructions which, when executed by one or more processors, cause the one or more processors to carry out operations comprising:

receiving, from a remote system:

object data comprising, for each object of a plurality of objects, values of a set of adjustable parameters of a respective object representation model; and compositing data indicating at least, for each object of the plurality of objects, a respective trajectory of the object relative to a reference frame; and processing the object data and the compositing data, using the respective object representation models, to generate output video data depicting a scene comprising, for each object of the plurality of objects, an animated representation of the object following the respective trajectory relative to the reference frame, wherein for each object of the plurality of objects, the respective object representation model comprises a respective neural network and is to generate, using the respective neural network, animated representations of the object in which a geometry the object is controllable by the set of adjustable parameters, wherein generating the output video data comprises:

for each object of the plurality of objects, using the respective object representation model and the values of the set of adjustable parameters for the respective object representation model to generate a respective video layer depicting the animated representation of the object; and composing the generated video layers in accordance with the compositing data to generate the output video data, wherein for a first object of the plurality of objects, the respective neural network is arranged to:

receive input video data depicting a region of the scene; and generate the respective video layer to comprising a reproduction and/or extension of the region of the scene around the animated representation of the first object.

* * * * *